United States Patent [19]
Kitamura et al.

[11] Patent Number: 6,100,315
[45] Date of Patent: Aug. 8, 2000

[54] INK FOR INK JET RECORDING

[75] Inventors: Kazuhiko Kitamura; Hiroshi Itoh; Hitosi Ohta, all of Suwa, Japan

[73] Assignee: Seiko Epson Corporation, Tokyo, Japan

[21] Appl. No.: 09/198,817

[22] Filed: Nov. 23, 1998

Related U.S. Application Data

[63] Continuation of application No. PCT/JP98/01307, Mar. 25, 1998.

[30] Foreign Application Priority Data

| Mar. 25, 1997 | [JP] | Japan | 9-72215 |
|---|---|---|---|
| Mar. 25, 1997 | [JP] | Japan | 9-72216 |
| Mar. 25, 1997 | [JP] | Japan | 9-72218 |
| Jun. 2, 1997 | [JP] | Japan | 9-144060 |
| Oct. 16, 1997 | [JP] | Japan | 9-284134 |
| Oct. 16, 1997 | [JP] | Japan | 9-284135 |
| Nov. 21, 1997 | [JP] | Japan | 9-321095 |
| Nov. 21, 1997 | [JP] | Japan | 9-321096 |

[51] Int. Cl.$^7$ .......................... C09D 11/02; C09D 11/10; C09D 11/16

[52] U.S. Cl. ...................... 523/160; 523/161; 106/31.43; 106/31.75

[58] Field of Search ..................... 523/160, 161; 106/31.27, 31.28, 31.43, 31.47, 31.49, 31.57, 31.6, 31.75, 31.76, 31.77, 31.78, 31.85

[56] References Cited

U.S. PATENT DOCUMENTS

| 4,659,382 | 4/1987 | Kang | 106/22 |
|---|---|---|---|
| 5,017,224 | 5/1991 | Tomita | 106/22 |
| 5,019,164 | 5/1991 | Tomita | 106/22 |
| 5,026,426 | 6/1991 | Russell | 106/31.43 |
| 5,223,026 | 6/1993 | Schwarz, Jr. | 106/31.43 |
| 5,441,563 | 8/1995 | Sideman et al. | 524/94 |
| 5,482,545 | 1/1996 | Aoki | 106/22 K |
| 5,507,865 | 4/1996 | Yoshida et al. | 106/31.43 |
| 5,531,818 | 7/1996 | Lin et al. | 106/31.28 |
| 5,560,771 | 10/1996 | Takemoto et al. | 106/31.47 |
| 5,667,572 | 9/1997 | Taniguchi et al. | 106/31.36 |
| 5,690,721 | 11/1997 | Itoh | 106/31.13 |
| 5,693,129 | 12/1997 | Lin | 106/31.43 |
| 5,814,683 | 9/1998 | Branham | 523/161 |
| 5,837,045 | 11/1998 | Johnson et al. | 106/31.85 |
| 5,861,447 | 1/1999 | Nagasawa et al. | 523/161 |
| 5,888,285 | 3/1999 | Gundlach et al. | 106/31.43 |

FOREIGN PATENT DOCUMENTS

| 0 434 179 | 6/1991 | European Pat. Off. |
|---|---|---|
| 56-8472 | 1/1981 | Japan |
| 60-28471 | 2/1985 | Japan |
| 2-255876 | 10/1990 | Japan |
| 2-296876 | 12/1990 | Japan |
| 2-296878 | 12/1990 | Japan |
| 4-202270 | 7/1992 | Japan |
| 5-59316 | 3/1993 | Japan |
| 5-255626 | 10/1993 | Japan |
| 7-305011 | 11/1995 | Japan |
| 8113743 | 5/1996 | Japan |

*Primary Examiner*—Vasu Jagannathan
*Assistant Examiner*—Callie E. Shosho
*Attorney, Agent, or Firm*—Ladas & Parry

[57] ABSTRACT

Addition of a compound, selected from the group consisting of water-soluble hydroxypyridine derivatives, chain or cyclic amide compounds, imidazole derivatives, hydroxy-cyclic amine compounds, azole compounds, azine compounds, amidine derivatives, and purine derivatives, as a clogging preventive to an ink composition containing a cationic, water-soluble polymer enables the ink composition to yield an image having good waterfastness and to be less likely to cause nozzle clogging.

11 Claims, No Drawings

INK FOR INK JET RECORDING

This application is a continuation of International Application No. PCT/JP98/01307 filed Mar. 25, 1998.

FIELD OF THE INVENTION

The present invention relates to an ink composition which can yield a waterfast print and, when used in ink jet recording, effectively prevents nozzle clogging.

BACKGROUND ART

Several ink compositions containing a cationic, water-soluble polymer have been proposed as ink compositions for yielding waterfast prints.

For example, Japanese Patent Laid-Open No. 119280/1987 discloses an ink comprising a hydroxyethylated polyethyleneimine polymer and a dye component. This publication describes that polyethyleneimine, when used either alone or in combination with an acid or reactive dye, can develop waterfastness in the printed ink. Japanese Patent Laid-Open Nos. 255876/1990, 296878/1990, and 188174/1991 disclose an ink composition comprising a polyamine, with a molecular weight of not less than 300, having a primary amino group, an anionic dye, and a stability-imparting agent, such as urea or thiourea. These publications describe that the combination of the primary amine with the anionic dye can develop waterfastness in the printed ink.

Japanese Patent Laid-Open No. 305011/1995 discloses a water-base ink comprising a basic, water-soluble polymer, an anionic dye with the counter ion being a volatile base, and a buffering agent with the counter ion being a volatile base. This publication describes that, in the ink, the volatile base prevents the dissociation of the polymer and, after printing, the volatile base on paper is evaporated to allow a salt-forming reaction between the polymer and the dye to proceed, thereby developing waterfastness.

In the ink compositions comprising an anionic dye and a basic resin, the development of the waterfastness is considered attributable to a reaction of an anion of the dye with a cation of the resin on a recording medium. This is probably because, although both the dye and the resin are ionized and dissolved in the ink with a satisfactory amount of water being present therein, a reduction in amount of water as a result of drying to some extent after printing permits both the dye and the resin to be precipitated as a water-insoluble salt, thus developing the waterfastness.

These ink compositions, when used in ink jet recording under conventional conditions, do not pose any clogging problem. However, when they are allowed to stand under such conditions as will extremely accelerate drying, for example, in high temperature and low humidity environment, for a long period of time, the ink is often dried and solidified at the front end of nozzles, making it impossible to eject the ink. For this reason, an ink composition which does not cause the nozzle clogging problem even under such conditions has been desired in the art.

Japanese Patent Laid-Open No. 8472/1981 discloses an ink comprising an acid dye or a direct dye and a pyridine derivative. The pyridine derivative is added in order to improve the color development of the dye and to prevent an increase in viscosity of the ink. In this ink, however, waterfastness could not have been realized.

SUMMARY OF THE INVENTION

The present inventors have now found that the addition of a certain group of compounds to an ink composition comprising a cationic, water-soluble polymer can realize an ink composition that can yield a print having good waterfastness and at the same time is less likely to cause nozzle clogging. The present invention has been made based on such novel finding.

Accordingly, an object of the present invention is to provide an ink composition that can yield a print having good waterfastness and at the same time is less likely to cause nozzle clogging.

According to one aspect of the present invention, there is provided an ink composition comprising at least water, a colorant, a cationic, water-soluble polymer, and a clogging preventive, wherein the clogging preventive is selected from the group consisting of water-soluble hydroxypyridine derivatives, chain or cyclic amide compounds, imidazole derivatives, hydroxycyclic amine compounds, azole compounds, azine compounds, amidine derivatives, and purine derivatives.

DETAILED DESCRIPTION OF THE INVENTION

Ink Composition

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

Clogging Preventive

The ink composition of the present invention, when used in ink jet recording, effectively prevents nozzle clogging. An additional advantage of the ink composition of the present invention is that, even in a recording method wherein the ink composition flows through a fine bore of a fountain pen, the ink composition does not clog the fine bore.

According to the present invention, the clogging preventive is selected from (1) water-soluble hydroxypyridine derivatives, (2) chain or cyclic amide compounds, (3) imidazole derivatives, (4) hydroxycyclic amine compounds, (5) azole compounds, (6) azine compounds, (7) amidine derivatives, and (8) purine derivatives.

The addition of the above clogging preventive, for example, even when used with an ink jet recording apparatus placed under extreme conditions, i.e., under high temperature and low humidity conditions for a long period of time, can prevent the ink from being dried at the front end of nozzles. Further, even though the ink is dried and solidified as a result of further progress of drying, the solidified ink at the front end can be redissolved by the ink fed from the rear of the nozzle. Therefore, even after the ink is allowed to stand for a long period of time, returning to normal printing in an early stage can be realized.

Although the reason why, despite the fact that the solidification product of the ink is redissolvable, waterfastness is provided after printing has not been fully elucidated yet, it is believed as follows. As drying of the ink proceeds at the front end of the nozzle, water and other volatile ingredients evaporate, resulting in precipitation of a material comprising a mixture of a colorant with a polymer and a clogging preventive. This precipitate is redissolvable in the ink composition. On the other hand, upon printing on the recording medium, the colorant and the polymer are adsorbed onto paper fibers and consequently are present at a position relatively close to the surface of the recording medium, whereas the clogging preventive, together with water, penetrates the paper and does not locally exist together with the colorant and the polymer, probably leading to disappearance of the redissolvability. The above mechanism is merely hypothetical and is not intended to limit the present invention.

According to a preferred embodiment of the present invention, the content of the clogging preventive in the ink is approximately in the range of from 1 to 40% by weight based on the ink.

(1) Water-soluble Hydroxypyridine Derivatives

The water-soluble hydroxypyridine derivative used in the present invention is a water-soluble compound wherein a hydroxyl group is bonded directly or through a methylene chain to a pyridine ring. Specific examples thereof include 2-pyridinol, 3-pyridinol, 4-pyridinol, 3-methyl-2-pyridinol, 4-methyl-2-pyridinol, 6-methyl-2-pyridinol, 2-pyridinemethanol, 3-pyridinemethanol, 4-pyridinemethanol, 2-pyridineethanol, 3-pyridineethanol, 4-pyridineethanol, 2-pyridinepropanol, 3-pyridinepropanol, 4-pyridinepropanol, α-methyl-2-pyridinemethanol, and 2,3-pyridinediol. They may be used alone or as a mixture of two or more.

(2) Chain or Cyclic Amide Compounds

The water-soluble chain or cyclic amide compound used in the present invention is a chain amide derivative having 1 to 8 carbon atoms, preferably 1 to 6 carbon atoms, or a cyclic amide derivative having 4 to 8 carbon atoms, preferably 4 to 6 carbon atoms. Specific examples thereof include lactamide, methyl carbamate, ethyl carbamate, propyl carbamate, formamide, N-methylformamide, N,N-diethylformamide, N,N-dimethylformamide, acetamide, N-methylacetamide, N,N-dimethylacetamide, propionamide, N-methylpropionamide, nicotinamide, 6-aminonicotinamide, N,N-diethylnicotinamide, N-ethylnicotinamide, N-methylpyrrolidone, 5-methyl-2-pyrrolidone, 5-hydroxymethyl-2-pyrrolidone, δ-valerolactam, ε-caprolactam, heptlactam, pyroglutamic acid, N-methyl-ε-caprolactam, and β-propiolactam. They may be used alone or as a mixture of two or more.

(3) Imidazole Derivatives

The imidazole derivative used in the present invention is a water-soluble compound which is soluble in water and comprises a hydroxyl group, a carboxyl group, or a lower alkyl (for example, an alkyl having 1 to 6 carbon atoms, preferably 1 to 4 carbon atoms) bonded to an imidazole ring. Specific examples of imidazole derivatives usable herein include imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazole, histamine, histidine, imidazoleacetic acid, 4-methylimidazole, 4-imidazoleacrylic acid, 4,5-imidazoledicarboxylic acid, and pilocarpine. They may be used alone or as a mixture of two or more.

(4) Hydroxycyclic Amine Compounds

The hydroxycyclic amine compound used in the present invention is a water-soluble compound which is soluble in water and comprises a hydroxyl group bonded directly or through a methylene chain to a cyclic amine (preferably a five- or six-membered cyclic amine). Specific examples of hydroxycyclic amine compounds usable herein include 4-hydroxypiperidine, 3-hydroxypiperidine, 2-hydroxypiperidine, N-methyl-3-hyroxypiperidine, N-ethyl-3-hydroxypiperidine, N-methyl-3-hydroxymethylpiperidine, N-methyl-2-hydroxymethylpiperidine, N-(2-hydroxyethyl)piperidine, 2-(2-hydroxyethyl)piperidine, 4-(2-hydroxyethyl) piperidine, N-(2-hydroxyethyl)piperazine, N-(2-hydroxyethyl)morpholine, N-(2-hydroxypropyl) morpholine, N-(2-hydroxyethyl)pyrrole, pyrrolinol, N-(2-hydroxyethyl)pyrrolidine, N-methyl-2-(2-hydroxyethyl) pyrrolidine, N-(2-hydroxyethyl)ethyleneimine, 3-oxypyrazole, and 5-oxypyrazole. They may be used alone or as a mixture of two or more.

(5) Azole Compounds

The azole compound used in the present invention is a five-membered heterocyclic compound which is soluble in water, has in its heterocyle at least two hetero atoms with at least one of the hetero atoms being nitrogen. Particularly preferred is an azole compound with two or three hetero atoms present in the heterocycle. Preferably, the hetero atom is selected from nitrogen, oxygen, and sulfur. Specific examples of azole compounds usable herein include 1,2,3-triazole, 1,2,4-triazole, 1,2,3-triazole-4,5-dicarboxylic acid, 1H-1,2,4-triazole-3-thiol, benzotriazole, benzotriazole-5-carboxylic acid, 1H-benzotriazole-1-methanol, pyrazole, tetrazole, oxazole, N1-(4,5-dimethyl-2-oxazolyl) sulfanilamide, thiazole, 2-aminothiazole, 2-thiazolecarboxyaldehyde, 5-thiazolemethanol, 1,2,3-thiadiazole, benzimidazole, benzimidazole-2-carbamic acid, (2-benzimidazolyl)acetonitrile, 5-benzimidazolecarboxylic acid, 2-benzimidazoleethanol, 2-benzimidazolepropionic acid, and 2-mercaptobenzimidazole. They may be used alone or as a mixture of two or more.

(6) Azine Compounds

The azine compound used in the present invention is a six-membered heterocyclic compound which is soluble in water and has in its heterocycle at least two hetero atoms with at least one of the hetero atoms being nitrogen. Particularly preferred is an azine compound with two or three hetero atoms present in the heterocycle. Preferably, the hetero atom is selected from nitrogen, oxygen, and sulfur. Further, a carboxyl group or a lower alkyl (for example, an alkyl having 1 to 6 carbon atoms, preferably 1 to 4 carbon atoms) may be present as a substituent. Specific examples of azine compounds usable herein include pyrazine, pyrazineamide, hexahydropyrazine, 3-ethyl-2,6-dimethylpyrazine, pyrazine-2,3-dicarboxylic acid, pyrazinecarbonitrile, 2,3-pyrazinedicarbonitrile, 2,3-pyrazinecarboxyamide, 2,3-pyrazine dicarboxylic pyrazineethanethiol, triazine, cyanuric acid, methyl cyanurate, melamine, trithiocyanuric acid, pyridazine, 4-pyridazinecarboxylic acid, cytosine, and cytosine-5-carboxylic acid. They may be used alone or as a mixture of two or more.

(7) Amidine Derivatives

The amidine derivative used in the present invention is a water-soluble amidine derivative, preferably a guanidine derivative. Specific examples of amidine derivatives usable herein include guanidine, 1-methyl-3-nitro-1-nitrosoguanidine, 1-amyl-3-nitro-1-nitrosoguanidine, nitroguanidine, sulfaguanidine, guanidinoacetic acid, guanithidine, aminoguanidine, canavanine, argininosuccinic acid, arginine, and biguanide. They may be used alone or as a mixture of two or more.

(8) Purine Derivatives

The purine derivative used in the present invention is soluble in water. Purine derivatives usable herein include purine, purineriboside, 2-amino-6-mercaptopurine, 6-(methylthio)purineriboside, 6-benzylaminopurine, xanthosine, guanine, 2'-deoxyguanosine, guanosine, o-methylguanine, methylguanine, caffeine, xanthine, theophylline, theobromine, adenine, adenosine, 2'-deoxyadenosine, N-benzyl-9-(2-tetrahydropyranyl) adenine, and adenosine triphosphate. They may be used alone or as a mixture of two or more.

Colorant

In the ink composition of the present invention, the colorant may be in the state of dispersion or dissolution in the ink with the dissolved state being preferred.

According to a preferred embodiment of the present invention, the colorant used in the present invention is soluble in an alkali. The alkali-soluble colorant refers to a colorant soluble in an alkaline medium and may be such that the water-soluble group contained in the molecule is an acidic or basic dissociative group or nondissociative functional group, or alternatively a plurality of kinds of these groups are present in the molecule. The alkali-soluble colorant may be soluble in an acidic solution so far as it is soluble in an alkali.

The colorant, which has been dissolved in an alkali, generally has affinity for the cationic, water-soluble polymer. Since this polymer has high affinity for paper fibers, the polymer, upon printing, is fixed onto the paper fibers. Further, it is considered that the colorant combines with the polymer to form a water-insoluble salt which is then fixed onto the paper, thus developing waterfastness.

Preferably, the colorant is added in an amount of 0.5 to 20% by weight based on the total weight of the ink composition. When the amount of the colorant added is in the above range, the ink composition can yield a print having satisfactory optical density and has a viscosity suitable for ink jet recording.

The colorant may be either a dye or a pigment. The dye refers to an organic color material soluble in water, and preferred dyes are those that fall into categories of acidic dyes, direct dyes, reactive dyes, soluble vat dyes, and food dyes according to the color index. Further, colorants, insoluble in neutral water, falling within categories of oil-soluble dyes and basic dyes according to the color index may also be used so far as they are soluble in an aqueous alkali solution.

On the other hand, the pigment refers to an organic color material that is generally insoluble in water. Some of pigments are soluble in an alkali, and these alkali-soluble pigments also may be used in the present invention.

Examples of dyes and pigments usable herein include: yellow dyes and pigments, such as C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 55, 58, 85, 86, 87, 88, 89, 98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and C.I. Pigment Yellow 23; red dyes and pigments, such as C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and C.I. Pigment Red 41, 48, 54, 57, 58, 63, 68, and 81; blue dyes and pigments, such as C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 29, C.I. Food Blue 1 and 2, C.I. Basic Blue 9, 25, 28, 29, and 44, and C.I. Pigment Blue 1 and 17; and black dyes and pigments, such as C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191, C.I. Direct Black 17, 19, 22, 32, 35, 38, 51, 56, 62, 71, 74, 75, 77, 94, 105, 106, 107, 108, 112, 113, 117, 118, 132, 133, 146, 154, 168, 171, and 195, C.I. Reactive Black 1, 3, 4, 5, 6, 8, 9, 10, 12, 13, 14, and 18, C.I. Solubilized Vat Black 1, and C.I. Food Black 2.

These colorants may be used alone or as a mixture of two or more.

Cationic, Water-soluble Polymer

The cationic, water-soluble polymer is in the state of dissolution in the ink and, after printing on a recording medium, serves to fix the colorant onto the recording medium to impart waterfastness.

According to a preferred embodiment of the present invention, the cationic, water-soluble polymer has in its molecule a structure selected from at least ethyleneimine, vinylamine, allylamine, and diallylamine. It is considered that the presence of the cationic structure in the molecule permits the polymer to interact with the alkali-soluble colorant and enables the waterfastness to be developed after printing.

Examples of cationic, water-soluble polymers usable herein include homopolymers of polyethyleneimine, polyvinylamine, polyallylamine, and polydiallylamine that have the above structure alone. Further, besides polymers of primary amines, polymers of secondary, tertiary, and quaternary amines may also be used. It is also possible to use a copolymer having at least the above structure. Examples of such copolymers include copolymers of the above monomers with acrylamide, hydroxyesters of methacrylic acid, such as hydroxyethyl methacrylate, vinylpyrrolidone, vinyl acetate, acrylic acid, maleic acid, sulfur dioxide and the like.

Commercially available cationic, water-soluble polymers may also be utilized, and examples thereof include: polyethyleneimine derivatives available from Nippon Shokubai Kagaku Kogyo Co., Ltd. under tradename designations Epomin SP-003, SP-006, SP-012, SP-018, SP-103, SP-110, SP-200, and SP-1000; polyvinylamine derivatives available from Mitsubishi Chemical Corporation; polyallylamine derivatives available under tradename designations PAA-L, PAA-HC1-L, PAA-10C, PAA-CH$_3$COOH-S, and PAA-D11-HCl, polydiallylamine derivatives available under the tradename designations PAS-A-1, PAS-A-5, PAS-H-5L, PAS-J-81, PAS-880, PAS-92, PAS-M-1, and PAS-410, and polyallylamine hydrochloride derivatives available under the tradename designations Danfix 723, Danfix 202, Danfix 303, Danfix NK, Danfix F, Danfix 707, Danfix 808, Danfix T, Danfix 505RE, Danfix 5000, Danfix 7000, Danfix PAA, and Danfix HC, all of which are products of Nitto Boseki Co., Ltd.

These cationic, water-soluble polymers may be used alone or as a mixture of two or more.

Although the amount of the cationic, water-soluble polymer added may be properly determined, it is preferably approximately in the range of from 0.1 to 20% by weight based on the total amount of the ink composition.

Water and Other Ingredients

In the ink composition according to the present invention, water is a main medium of the water-base ink and serves to maintain the ingredients of the ink composition.

Water may be pure water, such as ion-exchanged water, water purified by ultrafiltration or reverse osmosis, or distilled water or ultrapure water. Further, use of water, which has been sterilized by ultraviolet irradiation, by addition of hydrogen peroxide, or by other methods, is preferred because, when the ink is stored for a long period of time, such water can prevent the occurrence of mold and bacteria.

The ink composition according to the present invention may further comprise a water-soluble organic solvent having a lower vapor pressure than pure water and/or a humectant selected from saccharides. Incorporation of the humectant, when the ink composition is used in ink jet recording, can prevent the evaporation of water to maintain the water content. On the other hand, the water-soluble organic solvent can improve the ejection stability and can easily modify the viscosity without changing the properties of the ink.

The water-soluble organic solvent refers to a medium capable of dissolving the solute and is selected from organic, water-soluble solvents having a lower vapor pressure than water. Examples of water-soluble organic solvents include: polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones such as acetonylacetone; γ-butyrolactone; esters such as triethyl phosphate; and furfuryl alcohol, tetrahydrofurfuryl alcohol, and thiodiglycol.

Preferred examples of saccharides usable herein include maltitol, sorbitol, gluconic lactone, and maltose.

Preferably, the humectant is added in an amount of about 5 to 50% based on the total amount of the ink.

The ink composition of the present invention may further comprise, besides the above ingredients, a penetration accelerator selected from lower alcohols, cellosolves, carbitols, and nonionic surfactants. The penetration accelerator lowers the surface tension of the ink, accelerates the penetration of the ink into a recording medium, and shortens the drying time of the ink. Examples of preferred penetration accelerators usable herein include: lower alcohols such as ethanol, isopropanol, butanol, and pentanol; cellosolves such as ethylene glycol monoethyl ether and ethylene glycol monobutyl ether; carbitols such as diethylene glycol monobutyl ether and triethylene glycol monobutyl ether glycol ether; and nonionic surfactants under tradename designations Surfynol 61, 82, 104, 440, 465, and 485 available from Air Products and Chemicals, Inc., and under tradename designations Nissan Nonion K-211, K-220, P-213, E-215, E-220, S-215, S-220, HS-220, NS-212, and NS-220 available from Nippon Oils & Fats Co., Ltd.

The ink composition may further comprise an acid. The addition of the acid enables the pH of the ink to be regulated in a wider range. The acid may be added to the ink either directly or as a salt of the cationic, water-soluble polymer with the acid. Specific examples of preferred acids include inorganic acids, such as chloric acid, bromic acid, iodic acid, sulfuric acid, phosphoric acid, and nitric acid, and organic acids, such as formic acid, acetic acid, propionic acid, n-butyric acid, isobutyric acid, n-valeric acid, glycolic acid, gluconic acid, lactic acid, and toluenesulfonic acid.

Preferably, assistants commonly used in inks for ink jet recording are optionally added to the ink composition of the present invention.

Examples of assistants usable herein include hydrotropy agents, pH adjustors, antimolds, chelating agents, preservatives, and rust preventives. When the ink is used in an ink jet recording method wherein the ink is charged, a specific resistance modifier selected from inorganic salts, such as lithium chloride, sodium chloride, and ammonium chloride, is added.

Hydrotropy agents usable herein include urea, alkylureas, ethyleneurea, propyleneurea, thiourea, guanidine acid salts, and tetraalkylammonium halides.

Examples of pH adjustors usable herein include: inorganic bases, such as sodium hydroxide, potassium hydroxide, lithium hydroxide, and ammonia; mono-, di-, or tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di-, or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methyl aminopropyl amine, dimethylaminopropanediamine, and methyliminobispropylamine.

EXAMPLES

Preparation of Cationic, Water-soluble Polymer

Preparation 1: Synthesis of Polyvinylamine

In a 1,000-ml, four-necked flask equipped with a stirrer, a cooling tube, a nitrogen gas inlet tube, and a reagent inlet, 21.3 g of N-vinylformamide and 300 g of ultrapure water were placed, followed by dissolution with stirring. The temperature of the solution was raised to 50° C. while introducing a nitrogen gas, 100 g of a 10% aqueous 2,2'-azobis-(2-amidinopropane) dihydrochloride solution was added to the solution, and the solution was then kept at 50° C. under a nitrogen gas stream with stirring for 8 hr, followed by purification and drying to give poly(N-vinylformamide).

The whole quantity of the resultant poly(N-vinylformamide) and 400 ml of ultrapure water were placed in a 2,000-ml, four-necked flask equipped with a stirrer, a cooling tube, a nitrogen gas inlet tube, and a reagent inlet, followed by dissolution with stirring. The solution was mixed with stirring while gradually adding 400 ml of a 1 N aqueous hydrochloric solution dropwise to the solution, followed by mixing with stirring for one hr. The temperature of the flask was raised to 100° C., and the system was mixed with stirring for 10 hr while maintaining the temperature at 100° C. After the completion of the reaction, the system was cooled, followed by purification and drying to give a polyvinylamine hydrochloride.

The polyvinylamine hydrochloride was dissolved in ultrapure water to prepare a 10% aqueous solution. The aqueous solution was passed through an ion exchange resin IRA 900 (tradename, manufactured by Organo Corp.), which has been ion-exchanged with sodium hydroxide to remove hydrochloric acid, and then dried to give a free-type polyvinylamine. The molecular weight of the free-type polyvinylamine was measured by gel permeation chromatography using polyethylene glycol as a standard and found to be about 2,000.

Preparation 2

A polyvinylamine was prepared in the same manner as in Preparation 1, except that the 10% aqueous 2,2'-azobis-(2-amidinopropane) dihydrochloride solution was used in an amount of 40 g. The molecular weight of the polyvinylamine thus prepared was measured by gel permeation chromatography using polyethylene glycol as a standard and found to be about 5,000.

Evaluation Methods

Ink compositions prepared in the following examples and comparative examples were evaluated as follows.

(1) Waterfastness

An ink was filled into an ink jet recording printer MJ-5000C (tradename, manufactured by Seiko Epson Corporation) and then printed. Recording media used were a neutral plain paper Xerox-P (tradename, manufactured by Fuji Xerox Co., Ltd.), acid plain paper EPP (tradename, manufactured by Seiko Epson Corporation), and a recycled paper Xerox-R (tradename, manufactured by Fuji Xerox Co., Ltd.). After the printing, the prints were allowed to stand for one hr and then evaluated for the waterfastness according to a water spotting test set forth in JIS L 0853 as follows. One drop of water was put on the printed area and allowed to stand until the print dried. The waterfastness was evaluated in terms of a color change (a density lowering) on the printed area. The evaluation criteria were as follows.

A (good): A color change of less than 15%
B (fair): A color change of 15 to less than 50%
C (failure): A color change of not less than 50%

(2) Storage Stability of Ink

The ink was then placed in a sample bottle made of glass and allowed to stand at 60 ° C. for one week and at −30° C. for one week. At the end of this storage period, the ink was inspected for the presence of sediments. The ink (2 cc) after the standing was passed through a filter having a diameter of 1 mm and a pore diameter of 10 $\mu$m, and the number of residues on the filter was measured by observation under a microscope (at 50×) to evaluate the storage stability based on the following criteria.

A (good): Less than 50
B (fair): 50 to 200
C (failure): More than 200

(3) Antidrying/anticlogging Property

The ink was loaded into an ink jet recording printer MJ-5000C (tradename, manufactured by Seiko Epson Corporation), and the printer with a print head removed from the home position was then allowed to stand under high temperature and low humidity conditions (40° C./25% RH) for two weeks. At the end of the standing period, the cleaning operation of the printer was executed until printing could be normally performed. The clogging resistance was evaluated in terms of the number of cleaning operations necessary for return to the normal printing according to the following criteria.

A (excellent): 0 to 1 cleaning operations
B (good): 2 to 5 cleaning operations
C (fair): 6 to 10 cleaning operations
D (failure): Not returned even after 10 cleaning operations

Preparation of Ink

Example A

Ink Compositions Containing Hydroxypyridine Derivative

Example A1

2-Pyridinol (15 g) as a hydroxypyridine derivative was dissolved in 50 g of ultrapure water. Further, 1.5 g of Direct Fast Black AB (tradename, manufactured by Sumitomo Chemical Co., Ltd., C.I. Direct Black 32) as a colorant was dissolved in the solution to prepare a dye solution. The polyvinylamine (0.5 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of 5 $\mu$m to prepare an ink.

Example A2

2-Pyridinemethanol (15 g) as a hydroxypyridine derivative was dissolved in 50 g of ultrapure water. Further, 2.5 g of Direct Fast Yellow R (tradename, manufactured by Sumitomo Chemical Co., Ltd., C.I. Direct Yellow 50) as a colorant was dissolved in the solution to prepare a dye solution. A polyallylamine PAA-10C (tradename, manufactured by Nitto Boseki Co., Ltd.) as a cationic, water-soluble polymer was added in an amount of 1% by weight on a solid basis to the dye solution with stirring, and, in addition, ultrapure water was added thereto to a total solution weight of 100 g, followed by stirring. The solution was then passed through a metal mesh filter having a pore diameter of 5 $\mu$m to prepare an ink.

Example A3

2-Pyridinemethanol (15 g) as a hydroxypyridine derivative was dissolved in 50 g of ultrapure water. Further, 2 g of Nippon Fast Red BB (tradename, manufactured by Sumitomo Chemical Co., Ltd., C.I. Direct Red 31) as a colorant was dissolved in the solution to prepare a dye solution. A polyethyleneimine SP-012 (tradename, manufactured by Nippon Shokubai Kagaku Kogyo Co., Ltd.) (1 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of 5 $\mu$m to prepare an ink.

Example A4

2-Pyridineethanol (15 g) as a hydroxypyridine derivative was dissolved in 50 g of ultrapure water. Further, 2 g of Kayarus Turquoise Blue GL (tradename, manufactured by Nippon Kayaku Co., Ltd., C.I. Direct Blue 86) as a colorant was dissolved in the solution to prepare a dye solution. A polyallylamine PAA-10C (tradename, manufactured by Nitto Boseki Co., Ltd.) as a cationic, water-soluble polymer was added in an amount of 0.75% by weight on a solid basis to the dye solution with stirring, and, in addition, ultrapure water was added thereto to a total solution weight of 100 g, followed by stirring. The solution was then passed through a metal mesh filter having a pore diameter of 5 $\mu$m to prepare an ink.

The inks prepared in Examples A1 and A4 were evaluated for the waterfastness, the storage stability thereof, and the antidrying/anticlogging property. For the inks prepared in Examples A2 and A3, the above properties were estimated. The results were as summarized in the following table.

| Ex. | (1) Waterfastness | (2) Storage stability | (3) Clogging |
|---|---|---|---|
| A1 | A | A | A |
| A2 | A | A | A |
| A3 | A | A | A |
| A4 | A | A | A |

Example A5

An ink was prepared in the same manner as in Example A1, except that the colorant was changed to 1.5 g of Nigrosine NB (tradename, manufactured by Sumitomo Chemical Co., Ltd., C.I. Acid Black 2).

Example A6

An ink was prepared in the same manner as in Example A1, except that the colorant was changed to 2 g of Mikethren Soluble Blue O (tradename, manufactured by Mitsui Toatsu Chemicals, Inc., C.I. Solubilized Vat Blue 1) and the amount of the polyvinylamine, synthesized in Preparation 1, used was changed to 0.75 g.

Example A7

An ink was prepared in the same manner as in Example A1, except that the colorant was changed to 2 g of Sumifix Brilliant Blue R (tradename, manufactured by Sumitomo Chemical Co., Ltd., C.I. Reactive Blue 19) and the amount of the polyvinylamine, synthesized in Preparation 1, used was changed to 0.75 g.

Example A8

An ink was prepared in the same manner as in Example A1, except that the hydroxypyridine derivative was changed to 15 g of 2-pyridineethanol, the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 1 g.

Example A9

An ink was prepared in the same manner as in Example A1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 1% by weight on a solid basis of a polyallylamine PAA-10C (tradename, manufactured by Nitto Boseki Co., Ltd.).

Example A10

An ink was prepared in the same manner as in Example A1, except that the hydroxypyridine derivative was changed to 15 g of 2-pyridineethanol, the colorant was changed to 2.5 g of Zapon Fast Yellow CGG (tradename, manufactured by BASF, C.I. Solvent Yellow 15), 1% by weight on a solid basis of a polyallylamine PAA-10C (tradename, manufactured by Nitto Boseki Co., Ltd.) was added as the cationic, water-soluble polymer, and 0.5 g of potassium hydroxide was further added.

Example A11

An ink was prepared in the same manner as in Example A1, except that the colorant was changed to 2 g of Pink 6G (tradename, manufactured by Nomakagaku Kogyo K.K., C.I. Pigment Red 81) and the amount of the polyvinylamine synthesized in Preparation 1 was changed to 1 g, and 1 g of potassium hydroxide was further added.

The inks prepared in Examples A5 to A11 were evaluated for the waterfastness, the storage stability thereof, and the antidrying/anticlogging property. The results were as summarized in the following table. From the results, it is apparent that not only dyes belonging to the category of water-soluble acid dyes, direct dyes, reactive dyes, soluble vat dyes, food dyes, and basic dyes but water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| A5 | A | A | A |
| A6 | B | A | B |
| A7 | A | B | B |
| A8 | B | A | A |
| A9 | A | B | B |
| A10 | A | B | B |
| A11 | A | B | B |

Example A12

An ink was prepared in the same manner as in Example A1, except that the amount of 2-pyridinol was changed to 5 g, the amount of Direct Fast Black AB was changed to 0.5 g, and the amount of the polyvinylamine synthesized in Preparation 1 was changed to 0.2 g.

Example A13

An ink was prepared in the same manner as in Example A1, except that the amount of Direct Fast Black AB was changed to 10 g and the cationic, water-soluble polymer was changed to 10 g of a polyethyleneimine SP-012 (tradename, manufactured by Nippon Shokubai Kagaku Kogyo Co., Ltd.).

Example A14

An ink was prepared in the same manner as in Example A1, except that the amount of 2-pyridinol was changed to 20 g, the amount of Direct Fast Black AB was changed to 20 g, and the cationic, water-soluble polymer was changed to 20 g of a polyethyleneimine SP-003 (tradename, manufactured by Nippon Shokubai Kagaku Kogyo Co., Ltd.).

The inks prepared in Examples A12 to A14 were evaluated for the waterfastness, the storage stability thereof, and the antidrying/anticlogging property. The results were as summarized in the following table. From the results, it is apparent that the amount of the colorant is preferably 0.5 to 20% by weight based on the ink.

| Ex. | (1) Waterfastness | (2) Storage stability | (3) Clogging |
|---|---|---|---|
| A12 | A | A | A |
| A13 | A | A | B |
| A14 | B | B | B |

Example A15

An ink was prepared in the same manner as in Example A1, except that the amount of the cationic, water-soluble polymer was changed to 1 g of a polyethyleneimine SP-012 (tradename, manufactured by Nippon Shokubai Kagaku Kogyo Co., Ltd.).

Example A16

An ink was prepared in the same manner as in Example A1, except that the hydroxypyridine derivative was changed to 15 g of 2-pyridinemethanol.

Example A17

An ink was prepared in the same manner as in Example A1, except that the cationic, water-soluble polymer was changed to 0.75% by weight on a solid basis of a copolymer of a diallylamine with sulfur dioxide, PAS-A-1 (tradename, manufactured by Nitto Boseki Co., Ltd.), and 0.1 g of potassium hydroxide was further added.

Example A18

An ink was prepared in the same manner as in Example A1, except that the cationic, water-soluble polymer was changed to 0.75% by weight on a solid basis of a polyallylamine hydrochloride Danfix 723 (tradename, manufactured by Nitto Boseki Co., Ltd.), and 0.3 g of potassium hydroxide was further added.

Example A19

An ink was prepared in the same manner as in Example A1, except that the cationic, water-soluble polymer was changed to a polyallylamine PAA-L (tradename, manufactured by Nitto Boseki Co., Ltd.) and 0.1 g of 1 N hydrochloric acid was further added.

The inks prepared in Examples A15 to A19 were evaluated for the waterfastness, the storage stability thereof, and the antidrying/anticlogging property. For the ink prepared in Example A16, the above properties were estimated. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| A15 | B | A | A |
| A16 | A | A | B |
| A17 | A | A | B |
| A18 | A | A | A |
| A19 | B | A | A |

Example A20

An ink was prepared in the same manner as in Example A1, except that the hydroxypyridine derivative was changed to 5 g of 4-pyridineethanol, the amount of Direct Fast Black AB was changed to 0.5 g, the cationic, water-soluble polymer was changed to 0.1% by weight on a solid basis of a polydiallylamine PAS-H-5L (tradename, manufactured by Nitto Boseki Co., Ltd.), and 2 g of 2-(dimethylamino) ethanol was further added.

Example A21

An ink was prepared in the same manner as in Example A1, except that the amount of the ultrapure water initially charged was changed to 30 g, the amount of 2-pyridinol was changed to 20 g, the amount of Direct Fast Black AB was changed to 3 g, and the cationic, water-soluble polymer was changed to 10 g of a polyethyleneimine, Epomin SP-018 (tradename, manufactured by Nippon Shokubai Kagaku Kogyo Co., Ltd.).

Example A22

An ink was prepared in the same manner as in Example A1, except that the amount of the ultrapure water to be initially charged was changed to 30 g, the amount of 2-pyridinol was changed to 30 g, the amount of Direct Fast Black AB was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples A20 to A22 were evaluated for the waterfastness, the storage stability thereof, and the antidrying/anticlogging property. For the ink prepared in Example A20, the above properties were estimated. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
|---|---|---|---|
| A20 | A | A | A |
| A21 | A | A | A |
| A22 | A | B | B |

Example A23

An ink was prepared in the same manner as in Example A1, except that the amount of 2-pyridinol was changed to 1 g and the colorant was changed to 0.5 g of Nigrosine NB (tradename, manufactured by Sumitomo Chemical Co., Ltd., C.I. Acid Black 2).

Example A24

An ink was prepared in the same manner as in Example A1, except that the amount of the ultrapure water to be initially charged was changed to 30 g, the amount of 2-pyridinol was changed to 20 g, and the colorant was changed to 2 g of Nigrosine NB (tradename, manufactured by Sumitomo Chemical Co., Ltd., C.I. Acid Black 2).

Example A25

An ink was prepared in the same manner as in Example A1, except that the amount of the ultrapure water to be initially charged was changed to 30 g, the amount of 2-pyridinol was changed to 40 g, and the colorant was changed to 5 g of Nigrosine NB (tradename, manufactured by Sumitomo Chemical Co., Ltd., C.I. Acid Black 2).

The inks prepared in Examples A23 to A25 were evaluated for the waterfastness, the storage stability thereof, and the antidrying/anticlogging property. The results were as summarized in the following table. From the results, it is apparent that the amount of the water-soluble hydroxypyridine derivative added is preferably 1 to 40% by weight based on the ink.

| Ex. | (1) Waterfastness | (2) Storage stability | (3) Clogging |
|---|---|---|---|
| A23 | A | A | A |
| A24 | A | A | A |
| A25 | B | A | A |

Example A26

An ink was prepared in the same manner as in Example A1, except that the amount of 2-pyridinol was changed to 10 g and 10 g of glycerin was added as a humectant.

Example A27

An ink was prepared in the same manner as in Example A1, except that the amount of 2-pyridinol was changed to 10 g and 10 g of maltitol was added as a humectant.

Example A28

An ink was prepared in the same manner as in Example A1, except that the amount of 2-pyridinol was changed to 10 g and 10 g of thiodiglycol was added as a humectant.

The inks prepared in Examples A26 to A28 were evaluated for the waterfastness, the storage stability thereof, and the antidrying/anticlogging property. The results were as summarized in the following table. From the results, it is apparent that addition of a humectant is preferred.

| Ex. | (1) Waterfastness | (2) Storage stability | (3) Clogging |
|---|---|---|---|
| A26 | A | A | A |
| A27 | A | A | A |
| A28 | A | A | A |

Example A29

An ink was prepared in the same manner as in Example A1, except that the amount of Direct Fast Black AB was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 10 g of diethylene glycol monobutyl ether as a penetration accelerator were added.

Example A30

An ink was prepared in the same manner as in Example A1, except that the amount of Direct Fast Black AB was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example A31

An ink was prepared in the same manner as in Example A1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.5 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example A32

An ink was prepared in the same manner as in Example A1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.5 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples A29 to A32 were evaluated for the waterfastness, the storage stability thereof, and the antidrying/anticlogging property. The results were as summarized in the following table. From the results, it is apparent that addition of a humectant is preferred.

| Ex. | (1) Waterfastness | (2) Storage stability | (3) Clogging |
|---|---|---|---|
| A29 | A | A | A |
| A30 | A | A | A |
| A31 | A | A | A |
| A32 | A | A | A |

A blotted image was printed, using the inks prepared in Examples A29 to A32 with a penetration accelerator added thereto, on a neutral plain paper Xerox-P (tradename, manufactured by Fuji Xerox Co., Ltd.), acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were quick-drying, ultrahigh penetrative inks.

Comparative Example A

Comparative Example A1

An ink was prepared in the same manner as in Example A1, except that 15 g of urea was used instead of 2-pyridineethanol as the hydroxypyridine derivative and, in addition, 10 g of glycerin was added.

Comparative Example A2

An ink was prepared in the same manner as in Example A1, except that 15 g of thiourea was used instead of 2-pyridineethanol as the hydroxypyridine derivative and, in addition, 10 g of glycerin was added.

Comparative Example A3

An ink was prepared in the same manner as in Example A1, except that 30 g of urea was used instead of 2-pyridineethanol as the hydroxypyridine derivative and, in addition, 10 g of glycerin was added.

Comparative Example A4

An ink was prepared in the same manner as in Example A1, except that the polyvinylamine was changed to ultrapure water.

For the inks prepared in Comparative Examples A1 to A3, urea or thiourea as a stabilizer imparting agent was used instead of the hydroxypyridine derivative. These inks were evaluated for the waterfastness, the storage stability thereof, and the antidrying/anticlogging property. The results were as summarized in the following table. As is apparent from the results, the evaluation of the waterfastness and the storage stability was good or fair, while the evaluation of the antidrying/anticlogging property was fair or failure.

The ink prepared in Comparative Example A4 did not contain any cationic, water-soluble polymer and comprised a hydroxypyridine derivative, a dye, a water-soluble organic solvent, and water. This ink was evaluated for the waterfastness, the storage stability thereof, and the antidrying/anticlogging property. The results were as summarized in the following table. As is apparent from the table, this ink could not yield a waterfast image although the ink had satisfactory storage stability and antidrying/anticlogging property.

| Comp. Ex. | (1) Waterfastness | (2) Storage stability | (3) Clogging |
|---|---|---|---|
| A1 | A | A | D |
| A2 | A | A | D |
| A3 | A | A | C |
| A4 | C | A | A |

Example B

Example B1

Lactamide (15 g) as an amide compound was dissolved in 50 g of ultrapure water. Further, 5.0 g of Direct Fast Black AB (tradename, manufactured by Sumitomo Chemical Co., Ltd., C.I. Direct Black 32) as a colorant was dissolved in the solution to prepare a dye solution. The polyvinylamine (3.0 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of 5 μm to prepare an ink.

Example B2

Methyl carbamate (15 g) as an amide compound was dissolved in 50 g of ultrapure water. Further, 2.5 g of Direct Fast Yellow R (tradename, manufactured by Sumitomo Chemical Co., Ltd., C.I. Direct Yellow 50) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of 5 μm to prepare an ink.

Example B3

Nicotinamide (15 g) as an amide compound was dissolved in 50 g of ultrapure water. Further, 2 g of Nippon Fast Red BB (tradename, manufactured by Sumitomo Chemical Co., Ltd., C.I. Direct Red 31) as a colorant was dissolved in the solution to prepare a dye solution. A polyethyleneimine SP-012 (tradename, manufactured by Nippon Shokubai Kagaku Kogyo Co., Ltd.) (4 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of 5 μm to prepare an ink.

Example B4

5-Methyl-2-pyrrolidone (15 g) as an amide compound was dissolved in 50 g of ultrapure water. Further, 4.0 g of Kayarus Turquoise Blue GL (tradename, manufactured by Nippon Kayaku Co., Ltd., C.I. Direct Blue 86) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of 5 μm to prepare an ink.

The inks prepared in Examples B1 to B4 were evaluated for the waterfastness, the storage stability thereof, and the antidrying/anticlogging property. For the ink prepared in Example B3, the above properties were estimated. The results were as summarized in the following table.

| Ex. | (1) Waterfastness | (2) Storage stability | (3) Clogging |
|---|---|---|---|
| B1 | A | A | A |
| B2 | A | A | A |
| B3 | A | A | A |
| B4 | A | A | A |

Example B5

An ink was prepared in the same manner as in Example B1, except that the colorant was changed to 3.0 g of Nigrosine NB (tradename, manufactured by Sumitomo Chemical Co., Ltd., C.I. Acid Black 2).

Example B6

An ink was prepared in the same manner as in Example B1, except that the colorant was changed to 3.5 g of Mikethren Soluble Blue O (tradename, manufactured by Mitsui Toatsu Chemicals, Inc., C.I. Solubilized Vat Blue 1) and the amount of the polyvinylamine, synthesized in Preparation 1, used was changed to 1.5 g.

Example B7

An ink was prepared in the same manner as in Example B1, except that the colorant was changed to 2 g of Sumifix Brilliant Blue R (tradename, manufactured by Sumitomo Chemical Co., Ltd., C.I. Reactive Blue 19) and the cationic, water-soluble polymer was changed to 2.5% by weight on a solid basis of a polyallylamine PAA-L (tradename, manufactured by Nitto Boseki Co., Ltd.).

Example B8

An ink was prepared in the same manner as in Example B1, except that the amide compound was changed to 15 g of ethyl carbamate, the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 3 g.

Example B9

An ink was prepared in the same manner as in Example B1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 2% by weight on a solid basis of a polyallylamine PAA-10C (tradename, manufactured by Nitto Boseki Co., Ltd.).

Example B10

An ink was prepared in the same manner as in Example B1, except that the amide compound was changed to 15 g of ε-caprolactam, the colorant was changed to 2.5 g of Zapon Fast Yellow CGG (tradename, manufactured by BASF, C.I. Solvent Yellow 15), the cationic, water-soluble polymer was changed to 1.5% by weight on a solid basis of a polyallylamine hydrochloride Danfix 723 (tradename, manufactured by Nitto Boseki Co., Ltd.), and 0.7 g of potassium hydroxide was further added.

Example B11

An ink was prepared in the same manner as in Example B1, except that the colorant was changed to 2.5 g of Pink 6G (tradename, manufactured by Noma Kagaku Kogyo K.K., C.I. Pigment Red 81), the cationic, water-soluble polymer was changed to 2.5% by weight on a solid basis of a polyallylamine hydrochloride Danfix 723 (tradename, manufactured by Nitto Boseki Co., Ltd.), and 1.2 g of potassium hydroxide was further added.

The inks prepared in Examples B5 to B11 were evaluated for the waterfastness, the storage stability thereof, and the antidrying/anticlogging property. For the ink prepared in Example B8, the above properties were estimated. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| B5 | A | A | A |
| B6 | B | A | B |
| B7 | A | B | B |
| B8 | B | A | A |
| B9 | A | B | B |
| B10 | A | B | B |
| B11 | A | B | B |

Example B12

An ink was prepared in the same manner as in Example B1, except that the amount of the lactamide was changed to 5 g, the amount of Direct Fast Black AB was changed to 0.5 g, and the amount of the polyvinylamine synthesized in Preparation 1 was changed to 0.3 g.

Example B13

An ink was prepared in the same manner as in Example B1, except that the amount of Direct Fast Black AB was changed to 10 g and the cationic, water-soluble polymer was changed to 10 g of a polyethyleneimine SP-012 (tradename, manufactured by Nippon Shokubai Kagaku Kogyo Co., Ltd.).

Example B14

An ink was prepared in the same manner as in Example B1, except that the amount of the lactamide was changed to 20 g, the amount of Direct Fast Black AB was changed to 20 g, and the cationic, water-soluble polymer was changed to 10% by weight on a solid basis of a polyallylamine PAA-10C (tradename, manufactured by Nitto Boseki Co., Ltd.) and 5% by weight on a solid basis of a polyallylamine hydrochloride Danfix 723 (tradename, manufactured by Nitto Boseki Co., Ltd.).

The inks prepared in Examples B12 to B14 were evaluated for the waterfastness, the storage stability thereof, and the antidrying/anticlogging property. The results were as summarized in the following table. From the results, it is apparent that the amount of the colorant used is preferably 0.5 to 20% by weight based on the ink.

| Ex. | (1) Waterfastness | (2) Storage stability | (3) Clogging |
|---|---|---|---|
| B12 | A | A | A |
| B13 | A | A | B |
| B14 | B | B | B |

Example B15

An ink was prepared in the same manner as in Example B1, except that the amount of the cationic, water-soluble polymer was changed to 2.5 g of a polyethyleneimine SP-012 (tradename, manufactured by Nippon Shokubai Kagaku Kogyo Co., Ltd.).

Example B16

An ink was prepared in the same manner as in Example B1, except that the amide compound was changed to 15 g of δ-valerolactam.

Example B17

An ink was prepared in the same manner as in Example B1, except that the cationic, water-soluble polymer was changed to 5% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example B18

An ink was prepared in the same manner as in Example B1, except that the cationic, water-soluble polymer was changed to 2% by weight on a solid basis of a polyallylamine hydrochloride Danfix 723 (tradename, manufactured by Nitto Boseki Co., Ltd.) and 0.7 g of potassium hydroxide was further added.

Example B19

An ink was prepared in the same manner as in Example B1, except that the cationic, water-soluble polymer was changed to 2% by weight on a solid basis of a polyallylamine PAA-L (tradename, manufactured by Nitto Boseki Co., Ltd.) and 0.1 g of 1 N hydrochloric acid was further added.

The inks prepared in Examples B15 to B19 were evaluated for the waterfastness, the storage stability thereof, and the antidrying/anticlogging property. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1)<br>Waterfastness | (2)<br>Storage stability | (3)<br>Clogging |
|---|---|---|---|
| B15 | B | A | A |
| B16 | A | A | B |
| B17 | A | A | B |
| B18 | A | A | A |
| B19 | B | A | A |

Example B20

An ink was prepared in the same manner as in Example B1, except that the amount of the amide compound was changed to 5 g of formamide, the amount of Direct Fast Black AB was changed to 0.5 g, the cationic, water-soluble polymer was changed to 0.1% by weight on a solid basis of a polydiallylamine PAS-H-5L (tradename, manufactured by Nitto Boseki Co., Ltd.), and 2 g of 2-(dimethylamino) ethanol was further added.

Example B21

An ink was prepared in the same manner as in Example B1, except that the amount of the ultrapure water to be initially charged was changed to 30 g, the amount of the lactamide was changed to 20 g, the amount of Direct Fast Black AB was changed to 3 g, and the cationic, water-soluble polymer was changed to 10% by weight on a solid basis of a polyallylamine PAA-10C (tradename, manufactured by Nitto Boseki Co., Ltd.).

Example B22

An ink was prepared in the same manner as in Example B1, except that the amount of the ultrapure water to be initially charged was changed to 30 g, the amount of the lactamide was changed to 30 g, the amount of Direct Fast Black AB was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples B20 to B22 were evaluated for the waterfastness, the storage stability thereof, and the antidrying/anticlogging property. For the ink prepared in Example B20, the above properties were estimated. The results were as summarized in the following table. From the results, it is apparent that the amount of the cationic, water-soluble polymer added is preferably 0.1 to 20% by weight based on the ink.

| Ex. | (1)<br>Waterfastness | (2)<br>Storage stability | (3)<br>Clogging |
|---|---|---|---|
| B20 | A | A | A |
| B21 | A | A | A |
| B22 | A | B | B |

Example B23

An ink was prepared in the same manner as in Example B1, except that the amount of the lactamide was changed to 1 g and the colorant was changed to 0.5 g of Nigrosine NB (tradename, manufactured by Sumitomo Chemical Co., Ltd., C.I. Acid Black 2).

Example B24

An ink was prepared in the same manner as in Example B1, except that the amount of the ultrapure water to be initially charged was changed to 30 g, the amount of the lactamide was changed to 20 g, and the colorant was changed to 2 g of Nigrosine NB (tradename, manufactured by Sumitomo Chemical Co., Ltd., C.I. Acid Black 2).

Example B25

An ink was prepared in the same manner as in Example B1, except that the amount of the ultrapure water to be initially charged was changed to 30 g, the amount of the lactamide was changed to 40 g, and the colorant was changed to 5 g of Nigrosine NB (tradename, manufactured by Sumitomo Chemical Co., Ltd., C.I. Acid Black 2).

The inks prepared in Examples B23 to B25 were evaluated for the waterfastness, the storage stability thereof, and the antidrying/anticlogging property. The results were as summarized in the following table. From the results, it is apparent that the amount of the water-soluble amide compound added is preferably 1 to 40% by weight based on the ink.

| Ex. | (1)<br>Waterfastness | (2)<br>Storage stability | (3)<br>Clogging |
|---|---|---|---|
| B23 | A | A | A |
| B24 | A | A | A |
| B25 | A | A | A |

Example B26

An ink was prepared in the same manner as in Example B2, except that the amide compound was changed to 10 g of pyroglutamic acid and 10 g of glycerin was added as a humectant.

Example B27

An ink was prepared in the same manner as in Example B2, except that the amide compound was changed to 10 g of 5-hydroxymethyl-2-pyrrolidone and 10 g of maltitol was added as a humectant.

Example B28

An ink was prepared in the same manner as in Example B2, except that the amide compound was changed to 10 g of propionamide and 10 g of thiodiglycol was added as a humectant.

The inks prepared in Examples B26 to B28 were evaluated for the waterfastness, the storage stability thereof, and the antidrying/anticlogging property. For the inks prepared in Examples B26 and B28, the above properties were estimated. The results were as summarized in the following table. From the results, it is apparent that addition of a humectant is preferred.

| Ex. | (1)<br>Waterfastness | (2)<br>Storage stability | (3)<br>Clogging |
|---|---|---|---|
| B26 | A | A | A |
| B27 | A | A | A |
| B28 | A | A | A |

Example B29

An ink was prepared in the same manner as in Example B1, except that the amount of Direct Fast Black AB was changed to 4 g, the cationic, water-soluble polymer was changed to 2.5% by weight on a solid basis of a polyallylamine hydrochloride Danfix 723 (tradename, manufactured by Nitto Boseki Co., Ltd.), and, in addition, 5 g of 2-(dimethylamino)ethanol and 10 g of diethylene glycol monobutyl ether as a penetration accelerator were added.

Example B30

An ink was prepared in the same manner as in Example B1, except that the amount of Direct Fast Black AB was changed to 4 g, the cationic, water-soluble polymer was changed to 4% by weight on a solid basis of a copolymer of a diallylamine with sulfur dioxide, PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example B31

An ink was prepared in the same manner as in Example B1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-M-1 (tradename, manufactured by Nitto Boseki Co., Ltd.), and, in addition, 0.9 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example B32

An ink was prepared in the same manner as in Example B1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-5 (tradename, manufactured by Nitto Boseki Co., Ltd.), and, in addition, 0.5 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples B29 to B32 were evaluated for the waterfastness, the storage stability thereof, and the antidrying/anticlogging property. The results were as summarized in the following table. From the results, it is apparent that addition of a penetration accelerator is preferred.

| Ex. | (1)<br>Waterfastness | (2)<br>Storage stability | (3)<br>Clogging |
|---|---|---|---|
| B29 | A | A | A |
| B30 | A | A | A |
| B31 | A | A | A |
| B32 | A | A | A |

A blotted image was printed, using the inks prepared in Examples B29 to B32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example B

Comparative Example B1

An ink was prepared in the same manner as in Example B1, except that 15 g of urea was used instead of the lactamide as the amide compound and, in addition, 10 g of glycerin was added.

Comparative Example B2

An ink was prepared in the same manner as in Example B1, except that 15 g of thiourea was used instead of the lactamide as the amide compound and, in addition, 10 g of glycerin was added.

Comparative Example B3

An ink was prepared in the same manner as in Example B1, except that 30 g of urea was used instead of the lactamide as the amide compound and, in addition, 10 g of glycerin was added.

The inks prepared in these comparative examples were evaluated for the waterfastness, the storage stability thereof, and the antidrying/anticlogging property. The results were as summarized in the following table.

| Comp.<br>Ex. | (1)<br>Waterfastness | (2)<br>Storage stability | (3)<br>Clogging |
|---|---|---|---|
| B1 | A | A | D |
| B2 | A | A | D |
| B3 | A | A | C |

Example C

Example C1

Imidazole (15 g) as an imidazole derivative was dissolved in 50 g of ultrapure water. Further, 5.0 g of Direct Fast Black AB (tradename, manufactured by Sumitomo Chemical Co., Ltd., C.I. Direct Black 32) as a colorant was dissolved in the solution to prepare a dye solution. The polyvinylamine (3.0 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of about 5 μm to prepare an ink.

Example C2

N-Methylimidazole (15 g) as an imidazole derivative was dissolved in 50 g of ultrapure water. Further, 2.5 g of Direct Fast Yellow R (tradename, manufactured by Sumitomo Chemical Co., Ltd., C.I. Direct Yellow 50) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

Example C3

N-Methylimidazole (15 g) as an imidazole derivative was dissolved in 50 g of ultrapure water. Further, 2 g of Nippon Fast Red BB (tradename, manufactured by Sumitomo Chemical Co., Ltd., C.I. Direct Red 31) as a colorant was dissolved in the solution to prepare a dye solution. A polyethyleneimine SP-012 (tradename, manufactured by Nippon Shokubai Kagaku Kogyo Co., Ltd.) (4 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of about 5 μm to prepare an ink.

Example C4

2-Methylimidazole (15 g) as an imidazole derivative was dissolved in 50 g of ultrapure water. Further, 4.0 g of Kayarus Turquoise Blue GL (tradename, manufactured by Nippon Kayaku Co., Ltd., C.I. Direct Blue 86) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

The inks prepared in Examples C1 to C4 were evaluated for the waterfastness, the storage stability thereof, and the antidrying/anticlogging property. The results were as summarized in the following table.

| Ex. | (1)<br>Waterfastness | (2)<br>Storage stability | (3)<br>Clogging |
|---|---|---|---|
| C1 | A | A | A |
| C2 | A | A | A |
| C3 | A | A | A |
| C4 | A | A | A |

Example C5

An ink was prepared in the same manner as in Example C1, except that the colorant was changed to 3.0 g of Nigrosine NB (tradename, manufactured by Sumitomo Chemical Co., Ltd., C.I. Acid Black 2).

Example C6

An ink was prepared in the same manner as in Example C1, except that the colorant was changed to 3.5 g of Mikethren Soluble Blue O (tradename, manufactured by Mitsui Toatsu Chemicals, Inc., C.I. Solubilized Vat Blue 1) and the amount of the polyvinylamine, synthesized in Preparation 1, used was changed to 1.5 g.

Example C7

An ink was prepared in the same manner as in Example C1, except that the colorant was changed to 2 g of Sumifix Brilliant Blue R (tradename, manufactured by Sumitomo Chemical Co., Ltd., C.I. Reactive Blue 19) and the cationic, water-soluble polymer was changed to 2.5% by weight on a solid basis of a polyallylamine PAA-L (tradename, manufactured by Nitto Boseki Co., Ltd.).

Example C8

An ink was prepared in the same manner as in Example C1, except that the imidazole derivative was changed to 15 g of 4-hydroxyimidazole, the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 3 g.

Example C9

An ink was prepared in the same manner as in Example C1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 2% by weight on a solid basis of a polyallylamine PAA-10C (tradename, manufactured by Nitto Boseki Co., Ltd.).

Example C10

An ink was prepared in the same manner as in Example C1, except that the imidazole derivative was changed to 15 g of 2-ethylimidazole, the colorant was changed to 2.5 g of Zapon Fast Yellow CGG (tradename, manufactured by BASF, C.I. Solvent Yellow 15), the cationic, water-soluble polymer was changed to 1.5% by weight on a solid basis of a polyallylamine hydrochloride Danfix 723 (tradename, manufactured by Nitto Boseki Co., Ltd.) and 0. 7 g of potassium hydroxide was further added.

Example C11

An ink was prepared in the same manner as in Example C1, except that the colorant was changed to 2.5 g of Pink 6G (tradename, manufactured by Noma Kagaku Kogyo K. K., C.I. Pigment Red 81), the cationic, water-soluble polymer was changed to 2.5% by weight on a solid basis of a polyallylamine hydrochloride Danfix 723 (tradename, manufactured by Nitto Boseki Co., Ltd.), and 1.2 g of sodium hydroxide was further added.

The inks prepared in Examples C5 to C11 were evaluated for the waterfastness, the storage stability thereof, and the antidrying/anticlogging property. For the inks prepared in Examples C8 and C10, the above properties were estimated. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| C5 | A | A | A |
| C6 | B | A | B |
| C7 | A | B | B |
| C8 | B | A | A |
| C9 | A | B | B |
| C10 | A | B | B |
| C11 | A | B | B |

Example C12

An ink was prepared in the same manner as in Example C1, except that the amount of imidazole was changed to 5 g, the amount of Direct Fast Black AB was changed to 0.5 g, and the amount of the polyvinylamine synthesized in Preparation 1 was changed to 0.3 g.

Example C13

An ink was prepared in the same manner as in Example C1, except that the amount of Direct Fast Black AB was changed to 10 g and the cationic, water-soluble polymer was changed to 10 g of a polyethyleneimine SP-012 (tradename, manufactured by Nippon Shokubai Kagaku Kogyo Co., Ltd.).

Example C14

An ink was prepared in the same manner as in Example C1, except that the amount of imidazole was changed to 20 g, the amount of Direct Fast Black AB was changed to 20 g, and the cationic, water-soluble polymer was changed to 10% by weight on a solid basis of a polyallylamine PAA-10C (tradename, manufactured by Nitto Boseki Co., Ltd.) and 5% by weight on a solid basis of a polyallylamine hydrochloride Danfix 723 (tradename, manufactured by Nitto Boseki Co., Ltd.).

The inks prepared in Examples C12 to C14 were evaluated for the waterfastness, the storage stability thereof, and the antidrying/anticlogging property. The results were as summarized in the following table. From the results, it is apparent that the amount of the colorant used is preferably 0.5 to 20% by weight based on the ink.

| Ex. | (1) Waterfastness | (2) Storage stability | (3) Clogging |
|---|---|---|---|
| C12 | A | A | A |
| C13 | A | A | B |
| C14 | B | B | B |

Example C15

An ink was prepared in the same manner as in Example C1, except that the amount of the cationic, water-soluble polymer was changed to 2.5 g of a polyethyleneimine SP-012 (tradename, manufactured by Nippon Shokubai Kagaku Kogyo Co., Ltd.).

Example C16

An ink was prepared in the same manner as in Example C1, except that the imidazole derivative was changed to 15 g of 4-methylimidazole.

Example C17

An ink was prepared in the same manner as in Example C1, except that the cationic, water-soluble polymer was changed to 5% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example C18

An ink was prepared in the same manner as in Example C1, except that the cationic, water-soluble polymer was changed to 2% by weight on a solid basis of a polyallylamine hydrochloride Danfix 723 (tradename, manufactured by Nitto Boseki Co., Ltd.) and 0.7 g of potassium hydroxide was further added.

Example C19

An ink was prepared in the same manner as in Example C1, except that the cationic, water-soluble polymer was changed to 2% by weight on a solid basis of a polyallylamine PAA-L (tradename, manufactured by Nitto Boseki Co., Ltd.) and 0.1 g of 1 N hydrochloric acid was further added.

The inks prepared in Examples C15 to C19 were evaluated for the waterfastness, the storage stability thereof, and the antidrying/anticlogging property. For Example C16, the properties were estimated. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| C15 | B | A | A |
| C16 | A | A | B |
| C17 | A | A | B |
| C18 | A | A | A |
| C19 | B | A | A |

Example C20

An ink was prepared in the same manner as in Example C1, except that the imidazole derivative was changed to 5 g of 2-ethylimidazole, the amount of Direct Fast Black AB was changed to 0.5 g, the cationic, water-soluble polymer was changed to 0.1% by weight on a solid basis of a polydiallylamine PAS-H-5L (tradename, manufactured by Nitto Boseki Co., Ltd.), and 2 g of 2-(dimethylamino) ethanol was further added.

Example C21

An ink was prepared in the same manner as in Example C1, except that the amount of the ultrapure water to be initially charged was changed to 30 g, the amount of imidazole was changed to 20 g, the amount of Direct Fast Black AB was changed to 3 g, and the cationic, water-soluble polymer was changed to 10% by weight on a solid basis of a polyallylamine PAA-10C (tradename, manufactured by Nitto Boseki Co., Ltd.).

Example C22

An ink was prepared in the same manner as in Example C1, except that the amount of the ultrapure water to be initially charged was changed to 30 g, the amount of imidazole was changed to 30 g, the amount of Direct Fast Black AB was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples C20 to C22 were evaluated for the waterfastness, the storage stability thereof, and the antidrying/anticlogging property. For the ink prepared in Example C20, the above properties were estimated. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
|---|---|---|---|
| C20 | A | A | A |
| C21 | A | A | A |
| C22 | A | B | B |

Example C23

An ink was prepared in the same manner as in Example C1, except that the amount of imidazole was changed to 1 g and the colorant was changed to 0.5 g of Nigrosine NB (tradename, manufactured by Sumitomo Chemical Co., Ltd., C.I. Acid Black 2).

Example C24

An ink was prepared in the same manner as in Example C1, except that the amount of the ultrapure water to be initially charged was changed to 30 g, the amount of imidazole was changed to 20 g, and the colorant was changed to 2 g of Nigrosine NB (tradename, manufactured by Sumitomo Chemical Co., Ltd., C.I. Acid Black 2).

Example C25

An ink was prepared in the same manner as in Example C1, except that the amount of the ultrapure water to be initially charged was changed to 30 g, the amount of imidazole was changed to 40 g, and the colorant was changed to 5 g of Nigrosine NB (tradename, manufactured by Sumitomo Chemical Co., Ltd., C.I. Acid Black 2).

The inks prepared in Examples C23 to C25 were evaluated for the waterfastness, the storage stability thereof, and the antidrying/anticlogging property. The results were as summarized in the following table. From the results, it is apparent that the amount of the water-soluble imidazole derivative added is preferably 1 to 40% by weight based on the ink.

| Ex. | (1) Waterfastness | (2) Storage stability | (3) Clogging |
|---|---|---|---|
| C23 | A | A | A |
| C24 | A | A | A |
| C25 | B | A | A |

Example C26

An ink was prepared in the same manner as in Example C2, except that the imidazole derivative was changed to 10 g of 2-hydroxyimidazole and 10 g of glycerin was added as a humectant.

Example C27

An ink was prepared in the same manner as in Example C2, except that the imidazole derivative was changed to 10 g of imidazole acetic acid and 10 g of maltitol was added as a humectant.

Example C28

An ink was prepared in the same manner as in Example C2, except that the imidazole derivative was changed to 10 g of histamine and 10 g of thiodiglycol was added as a humectant.

The inks prepared in Examples C26 to C28 were evaluated for the waterfastness, the storage stability thereof, and the antidrying/anticlogging property. For the inks prepared in Examples C26 and C27, the above properties were estimated. The results were as summarized in the following table. From the results, it is apparent that addition of a humectant is preferred.

| Ex. | (1) Waterfastness | (2) Storage stability | (3) Clogging |
|---|---|---|---|
| C26 | A | A | A |
| C27 | A | A | A |
| C28 | A | A | A |

Example C29

An ink was prepared in the same manner as in Example C1, except that the amount of Direct Fast Black AB was changed to 4 g, the cationic, water-soluble polymer was changed to 2.5% by weight on a solid basis of a polyallylamine hydrochloride Danfix 723 (tradename, manufactured by Nitto Boseki Co., Ltd.), and, in addition, 5 g of 2-(dimethylamino)ethanol and 10 g of diethylene glycol monobutyl ether as a penetration accelerator were added.

Example C30

An ink was prepared in the same manner as in Example C1, except that the amount of Direct Fast Black AB was changed to 4 g, the cationic, water-soluble polymer was changed to 4% by weight on a solid basis of a copolymer of a diallylamine with sulfur dioxide, PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example C31

An ink was prepared in the same manner as in Example C1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-M-1 (tradename, manufactured by Nitto Boseki Co., Ltd.), and, in addition, 0.9 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example C32

An ink was prepared in the same manner as in Example C1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-5 (tradename, manufactured by Nitto Boseki Co., Ltd.), and, in addition, 0.5 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples C29 to C32 were evaluated for the waterfastness, the storage stability thereof, and the antidrying/anticlogging property. The results were as summarized in the following table. From the results, it is apparent that addition of a penetration accelerator is preferred.

| Ex. | (1) Waterfastness | (2) Storage stability | (3) Clogging |
|---|---|---|---|
| C29 | A | A | A |
| C30 | A | A | A |
| C31 | A | A | A |
| C32 | A | A | A |

A blotted image was printed, using the inks prepared in Examples C29 to C32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example C

Comparative Example C1

An ink was prepared in the same manner as in Example C1, except that 15 g of urea was used instead of imidazole as the imidazole compound and, in addition, 10 g of glycerin was added.

Comparative Example C2

An ink was prepared in the same manner as in Example C1, except that 15 g of thiourea was used instead of imidazole as the imidazole compound and, in addition, 10 g of glycerin was added.

Comparative Example C3

An ink was prepared in the same manner as in Example C1, except that 30 g of urea was used instead of imidazole as the imidazole compound and, in addition, 10 g of glycerin was added.

Comparative Example C4

An ink was prepared in the same manner as in Example C1, except that polyvinyl amine was changed to ultrapure water.

The inks prepared in these comparative examples were evaluated for the waterfastness, the storage stability thereof, and the antidrying/anticlogging property. The results were as summarized in the following table.

| Comp. Ex. | (1) Waterfastness | (2) Storage stability | (3) Clogging |
|---|---|---|---|
| C1 | A | A | D |
| C2 | A | A | D |
| C3 | A | A | C |
| C4 | C | A | A |

Example D

Example D1

N-(2-Hydroxyethyl)piperazine (15 g) as a hydroxy cyclic amine compound was dissolved in 50 g of ultrapure water. Further, 1.5 g of Kayarus Direct Black G (tradename, manufactured by Nippon Kayaku Co., Ltd., C.I. Direct Black 19) as a colorant was dissolved in the solution to prepare a dye solution. The polyvinylamine (0.5 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of about 5 µm to prepare an ink.

Example D2

N-(2-Hydroxyethyl)pyrrole (15 g) as a hydroxy cyclic amine compound was dissolved in 50 g of ultrapure water.

Further, 2.5 g of Direct Fast Yellow GC (tradename, manufactured by Sumitomo Chemical Co., Ltd., C.I. Direct Yellow 44) as a colorant was dissolved in the solution to prepare a dye solution. A polyallylamine PAA-10C (tradename, manufactured by Nitto Boseki Co., Ltd.) as a cationic, water-soluble polymer was added in an amount of 1% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

Example D3

N-(2-Hydroxyethyl)morpholine (15 g) as a hydroxy cyclic amine compound was dissolved in 50 g of ultrapure water. Further, 2 g of Kayaku Acid Rhodamine FB (tradename, manufactured by Nippon Kayaku Co., Ltd., C.I. Acid Red 52) as a colorant was dissolved in the solution to prepare a dye solution. A polyethyleneimine SP-012 (tradename, manufactured by Nippon Shokubai Kagaku Kogyo Co., Ltd.) (1 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of about 5 μm to prepare an ink.

Example D4

N-(2-Hydroxyethyl)ethyleneimine (15 g) as a hydroxy cyclic amine compound was dissolved in 50 g of ultrapure water. Further, 2 g of Kayarus Turquoise Blue GL (tradename, manufactured by Nippon Kayaku Co., Ltd., C.I. Direct Blue 86) as a colorant was dissolved in the solution to prepare a dye solution. A polyallylamine PAA-10C (tradename, manufactured by Nitto Boseki Co., Ltd.) as a cationic, water-soluble polymer was added in an amount of 0.75% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

The inks prepared in Examples D1 to D4 were evaluated for the waterfastness, the storage stability thereof, and the antidrying/anticlogging property. For the inks prepared in Examples D2 and D4, the above properties were estimated. The results were as summarized in the following table.

| Ex. | (1) Waterfastness | (2) Storage stability | (3) Clogging |
| --- | --- | --- | --- |
| D1 | A | A | A |
| D2 | A | A | A |
| D3 | A | A | A |
| D4 | A | A | A |

Example D5

An ink was prepared in the same manner as in Example D1, except that the colorant was changed to 1.5 g of Suminol Fast Black BR (tradename, manufactured by Sumitomo Chemical Co., Ltd., C.I. Acid Black 31).

Example D6

An ink was prepared in the same manner as in Example D1, except that the colorant was changed to 2 g of Mikethren Soluble Blue O (tradename, manufactured by Mitsui Toatsu Chemicals, Inc., C.I. Solubilized Vat Blue 1) and the amount of the polyvinylamine, synthesized in Preparation 1, used was changed to 0.75 g.

Example D7

An ink was prepared in the same manner as in Example D1, except that the colorant was changed to 2 g of Sumifix Brilliant Blue R (tradename, manufactured by Sumitomo Chemical Co., Ltd., C.I. Reactive Blue 19) and the amount of the polyvinylamine having a molecular weight of about 2,000, synthesized in Preparation 1, used was changed to 0.75 g.

Example D8

An ink was prepared in the same manner as in Example D1, except that the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 1 g.

Example D9

An ink was prepared in the same manner as in Example D1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 1% by weight on a solid basis of a polyallylamine PAA-10C (tradename, manufactured by Nitto Boseki Co., Ltd.).

Example D10

An ink was prepared in the same manner as in Example D1, except that the colorant was changed to 2.5 g of Zapon Fast Yellow CGG (tradename, manufactured by BASF, C.I. Solvent Yellow 15), 1% by weight on a solid basis of a polyallylamine PAA-10C (tradename, manufactured by Nitto Boseki Co., Ltd.) was added as the cationic, water-soluble polymer, and 0.3 g of potassium hydroxide was further added.

Example D11

An ink was prepared in the same manner as in Example D1, except that the colorant was changed to 2 g of Pink 6G (tradename, manufactured by Noma Kagaku Kogyo K.K., C.I. Pigment Red 81) and the amount of the polyvinylamine synthesized in Preparation 1 was changed to 1 g, and 0.5 g of potassium hydroxide was further added.

The inks prepared in Examples D5 to D11 were evaluated for the waterfastness, the storage stability thereof, and the antidrying/anticlogging property. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| D5 | A | A | A |
| D6 | B | A | B |
| D7 | A | B | B |
| D8 | B | A | A |
| D9 | A | B | B |
| D10 | A | B | B |
| D11 | A | B | B |

Example D12

An ink was prepared in the same manner as in Example D1, except that the hydroxy cyclic amine compound was changed to 5 g of N-(2-hydroxyethyl)morpholine, the amount of Kayarus Direct Black G was changed to 0.5 g, and the amount of the polyvinylamine synthesized in Preparation 1 was changed to 0.2 g.

Example D13

An ink was prepared in the same manner as in Example D1, except that the colorant was changed to 10 g of Suminol Fast Black BR (tradename, manufactured by Sumitomo Chemical Co., Ltd., C.I. Acid Black 31) and the cationic, water-soluble polymer was changed to 10 g of a polyethyleneimine SP-012 (tradename, manufactured by Nippon Shokubai Kagaku Kogyo Co., Ltd.).

Example D14

An ink was prepared in the same manner as in Example D1, except that the amount of N-(2-hydroxyethyl)piperazine was changed to 20 g, the colorant was changed to 20 g of Suminol Fast Black BR (tradename, manufactured by Sumitomo Chemical Co., Ltd., C.I. Acid Black 31), and the cationic, water-soluble polymer was changed to 20 g of a polyethyleneimine SP-003 (tradename, manufactured by Nippon Shokubai Kagaku Kogyo Co., Ltd.).

The inks prepared in Examples D12 to D14 were evaluated for the waterfastness, the storage stability thereof, and the antidrying/anticlogging property. The results were as summarized in the following table. From the results, it is apparent that the amount of the colorant is preferably 0.5 to 20% by weight based on the ink.

| Ex. | (1) Waterfastness | (2) Storage stability | (3) Clogging |
|---|---|---|---|
| D12 | A | A | A |
| D13 | A | A | B |
| D14 | B | B | B |

Example D15

An ink was prepared in the same manner as in Example D1, except that the amount of the cationic, water-soluble polymer was changed to 1 g of a polyethyleneimine SP-012 (tradename, manufactured by Nippon Shokubai Kagaku Kogyo Co., Ltd.).

Example D16

An ink was prepared in the same manner as in Example D1, except that the hydroxy cyclic amine compound was changed to 15 g of N-(2-hydroxyethyl)morpholine.

Example D17

An ink was prepared in the same manner as in Example D1, except that the cationic, water-soluble polymer was changed to 0.75% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example D18

An ink was prepared in the same manner as in Example D1, except that the cationic, water-soluble polymer was changed to 0.75% by weight on a solid basis of a polyallylamine hydrochloride Danfix 723 (tradename, manufactured by Nitto Boseki Co., Ltd.) and 0.2 g of potassium hydroxide was further added.

Example D19

An ink was prepared in the same manner as in Example D1, except that the cationic, water-soluble polymer was changed to a polyallylamine PAA-L (tradename, manufactured by Nitto Boseki Co., Ltd.) and 0.1 g of 1 N hydrochloric acid was further added.

The inks prepared in Examples D15 to D19 were evaluated for the waterfastness, the storage stability thereof, and the antidrying/anticlogging property. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| D15 | B | A | A |
| D16 | A | B | B |
| D17 | A | B | B |
| D18 | A | A | A |
| D19 | B | A | A |

Example D20

An ink was prepared in the same manner as in Example D1, except that the amount of N-(2-hydroxyethyl)piperazine was changed to 5 g, the amount of Kayarus Direct Black G was changed to 0.5 g, the cationic, water-soluble polymer was changed to 0.1% by weight on a solid basis of a polydiallylamine PAS-H-5L (tradename, manufactured by Nitto Boseki Co., Ltd.), and 1 g of 2-(dimethylamino) ethanol was further added.

Example D21

An ink was prepared in the same manner as in Example D1, except that the amount of the ultrapure water to be initially charged was changed to 30 g, the amount of N-(2-hydroxyethyl)piperazine was changed to 20 g, the amount of Kayarus Direct Black' G was changed to 3 g, and the cationic, water-soluble polymer was changed to 10 g of a polyethyleneimine, Epomin SP-018 (tradename, manufactured by Nippon Shokubai Kagaku Kogyo Co., Ltd.).

Example D22

An ink was prepared in the same manner as in Example D1, except that the amount of the ultrapure water to be initially charged was changed to 30 g, the hydroxy cyclic amine compound was changed to 30 g of N-methyl-3-hydroxypiperidine, the amount of Kayarus Direct Black G was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples D20 to D22 were evaluated for the waterfastness, the storage stability thereof, and the antidrying/anticlogging property. For the ink prepared in Example D22, the above properties were estimated. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
| --- | --- | --- | --- |
| D20 | A | A | A |
| D21 | A | B | A |
| D22 | A | B | B |

Example D23

An ink was prepared in the same manner as in Example D1, except that the amount of N-(2-hydroxyethyl)piperazine was changed to 1 g and the amount of Kayarus Direct Black G was changed to 0.5 g.

Example D24

An ink was prepared in the same manner as in Example D1, except that the amount of the ultrapure water to be initially charged was changed to 30 g, the amount of N-(2-hydroxyethyl)piperazine was changed to 20 g, and the amount of Kayarus Direct Black G was changed to 2 g.

Example D25

An ink was prepared in the same manner as in Example D1, except that the amount of the ultrapure water to be initially charged was changed to 30 g, the amount of N-(2-hydroxyethyl)piperazine was changed to 40 g, and the amount of Kayarus Direct Black G was changed to 5 g.

The inks prepared in Examples D23 to D25 were evaluated for the waterfastness, the storage stability thereof, and the antidrying/anticlogging property. The results were as summarized in the following table. From the results, it is apparent that the amount of the water-soluble hydroxy cyclic amine compound added is preferably 1 to 40% by weight based on the ink.

| Ex. | (1) Waterfastness | (2) Storage stability | (3) Clogging |
| --- | --- | --- | --- |
| D23 | A | A | A |
| D24 | A | A | A |
| D25 | B | A | A |

Example D26

An ink was prepared in the same manner as in Example D1, except that the amount of N-(2-hydroxyethyl)piperazine was changed to 10 g and 10 g of glycerin was added as a humectant.

Example D27

An ink was prepared in the same manner as in Example D1, except that the amount of N-(2-hydroxyethyl)piperazine was changed to 10 g and 10 g of maltitol was added as a humectant.

Example D28

An ink was prepared in the same manner as in Example D1, except that the amount of N-(2-hydroxyethyl)piperazine was changed to 10 g and 10 g of thiodiglycol was added as a humectant.

The inks prepared in Examples D26 to D28 were evaluated for the waterfastness, the storage stability thereof, and the antidrying/anticlogging property. The results were as summarized in the following table. From the results, it is apparent that addition of a humectant is preferred.

| Ex. | (1) Waterfastness | (2) Storage stability | (3) Clogging |
| --- | --- | --- | --- |
| D26 | A | A | A |
| D27 | A | A | A |
| D28 | A | A | A |

Example D29

An ink was prepared in the same manner as in Example D1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 10 g of diethylene glycol monobutyl ether as a penetration accelerator were added.

Example D30

An ink was prepared in the same manner as in Example D1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example D31

An ink was prepared in the same manner as in Example D1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example D32

An ink was prepared in the same manner as in Example D1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples D29 to D32 were evaluated for the waterfastness, the storage stability thereof, and the antidrying/anticlogging property. The results were as summarized in the following table. From the results, it is apparent that addition of a penetration accelerator is preferred.

| Ex. | (1) Waterfastness | (2) Storage stability | (3) Clogging |
|---|---|---|---|
| D29 | A | A | A |
| D30 | A | A | A |
| D31 | A | A | A |
| D32 | A | A | A |

A blotted image was printed, using the inks prepared in Examples D29 to D32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example D

Comparative Example D1

An ink was prepared in the same manner as in Example D1, except that 15 g of urea was used instead of N-(2-hydroxyethyl)piperazine as the hydroxy cyclic amine compound and, in addition, 10 g of glycerin was added.

Comparative Example D2

An ink was prepared in the same manner as in Example D1, except that 15 g of thiourea was used instead of N-(2-hydroxyethyl)piperazine as the hydroxy cyclic amine compound and, in addition, 10 g of glycerin was added.

Comparative Example D3

An ink was prepared in the same manner as in Example D1, except that 30 g of urea was used instead of N-(2-hydroxyethyl)piperazine as the hydroxy cyclic amine compound and, in addition, 10 g of glycerin was added.

The inks prepared in these comparative examples were evaluated for the waterfastness, the storage stability thereof, and the antidrying/anticlogging property. The results were as summarized in the following table.

| Comp. Ex. | (1) Waterfastness | (2) Storage stability | (3) Clogging |
|---|---|---|---|
| D1 | A | A | D |
| D2 | A | A | D |
| D3 | A | A | C |

Example E

Example E1

1,2,4-triazole (15 g) as an azole compound was dissolved in 50 g of ultrapure water. Further, 1.5 g of Kayarus Direct Black G (tradename, manufactured by Nippon Kayaku Co., Ltd., C.I. Direct Black 19) as a colorant was dissolved in the solution to prepare a dye solution. The polyvinylamine (0.5 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of about 5 μm to prepare an ink.

Example E2

Pyrazole (15 g) as an azole compound was dissolved in 50 g of ultrapure water. Further, 2.5 g of Direct Fast Yellow GC (tradename, manufactured by Sumitomo Chemical Co., Ltd., C.I. Direct Yellow 44) as a colorant was dissolved in the solution to prepare a dye solution. A polyallylamine PAA-10C (tradename, manufactured by Nitto Boseki Co., Ltd.) as a cationic, water-soluble polymer was added in an amount of 1% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

Example E3

Tetrazole (15 g) as an azole compound was dissolved in 50 g of ultrapure water. Further, 2 g of Kayaku Acid Rhodamine FB (tradename, manufactured by Nippon Kayaku Co., Ltd., C.I. Acid Red 52) as a colorant was dissolved in the solution to prepare a dye solution. A polyethyleneimine SP-012 (tradename, manufactured by Nippon Shokubai Kagaku Kogyo Co., Ltd.) (1 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of about 5 μm to prepare an ink.

Example E4

Kayarus Turquoise Blue GL (tradename, manufactured by Nippon Kayaku Co., Ltd., C.I. Direct Blue 86) (2 g) as a colorant was dissolved in 50 g of ultrapure water to prepare a dye solution. A polyallylamine PAA-10C (tradename, manufactured by Nitto Boseki Co., Ltd.) as a cationic, water-soluble polymer in an amount of 0.75% by weight on a solid basis and 15 g of thiazole as an azole compound were added to the dye solution with stirring and, in addition, ultrapure water was added thereto to a total solution weight of 100 g, followed by mixing with stirring. The solution was then passed through a metal mesh filter having a pore diameter of about 5 μm to prepare an ink.

The inks prepared in Examples E1 to E4 were evaluated for the waterfastness, the storage stability thereof, and the antidrying/anticlogging property. The results were as summarized in the following table.

| Ex. | (1) Waterfastness | (2) Storage stability | (3) Clogging |
| --- | --- | --- | --- |
| E1 | A | A | A |
| E2 | A | A | A |
| E3 | A | A | A |
| E4 | A | A | A |

Example E5

An ink was prepared in the same manner as in Example E1, except that the colorant was changed to 1.5 g of Suminol Fast Black BR (tradename, manufactured by Sumitomo Chemical Co., Ltd., C.I. Acid Black 31).

Example E6

An ink was prepared in the same manner as in Example E1, except that the colorant was changed to 2 g of Mikethren Soluble Blue O (tradename, manufactured by Mitsui Toatsu Chemicals, Inc., C.I. Solubilized Vat Blue 1) and the amount of the polyvinylamine, synthesized in Preparation 2, used was changed to 0.75 g.

Example E7

An ink was prepared in the same manner as in Example E1, except that the colorant was changed to 2 g of Sumifix Brilliant Blue R (tradename, manufactured by Sumitomo Chemical Co., Ltd., C.I. Reactive Blue 19) and the amount of the polyvinylamine, synthesized in Preparation 1, used was changed to 0.75 g.

Example E8

An ink was prepared in the same manner as in Example E1, except that the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 1 g.

Example E9

An ink was prepared in the same manner as in Example E1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 1% by weight on a solid basis of a polyallylamine PAA-10C (tradename, manufactured by Nitto Boseki Co., Ltd.).

Example E10

An ink was prepared in the same manner as in Example E1, except that the colorant was changed to 2.5 g of Zapon Fast Yellow CGG (tradename, manufactured by BASF, C.I. Solvent Yellow 15), 1% by weight on a solid basis of a polyallylamine PAA-10C (tradename, manufactured by Nitto Boseki Co., Ltd.) was added as the cationic, water-soluble polymer, and 0.3 g of potassium hydroxide was further added.

Example E11

An ink was prepared in the same manner as in Example E1, except that the colorant was changed to 2 g of Pink 6G (tradename, manufactured by Noma Kagaku Kogyo K.K., C.I. Pigment Red 81) and the amount of the polyvinylamine synthesized in Preparation 1 was changed to 1 g, and 0.5 g of potassium hydroxide was further added.

The inks prepared in Examples E5 to E11 were evaluated for the waterfastness, the storage stability thereof, and the antidrying/anticlogging property. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
| --- | --- | --- | --- |
| E5 | A | A | A |
| E6 | A | A | A |
| E7 | A | B | A |
| E8 | B | A | B |
| E9 | A | B | B |
| E10 | A | B | A |
| E11 | A | B | A |

Example E12

An ink was prepared in the same manner as in Example E1, except that the azole compound was changed to 5 g of 1H-benzotriazole-1-methanol, the amount of Kayarus Direct Black G as the colorant was changed to 0.5 g, and the amount of the polyvinylamine synthesized in Preparation 1 was changed to 0.2 g.

Example E13

An ink was prepared in the same manner as in Example E1, except that the colorant was changed to 10 g of Suminol Fast Black BR (tradename, manufactured by Sumitomo Chemical Co., Ltd., C.I. Acid Black 31) and the cationic, water-soluble polymer was changed to 10 g of a polyethyleneimine SP-012 (tradename, manufactured by Nippon Shokubai Kagaku Kogyo Co., Ltd.).

Example E14

An ink was prepared in the same manner as in Example E1, except that the amount of 1,2,4-triazole was changed to 20 g, the colorant was changed to 20 g of Suminol Fast Black BR (tradename, manufactured by Sumitomo Chemical Co., Ltd., C.I. Acid Black 31), and the cationic, water-soluble polymer was changed to 20 g of a polyethyleneimine SP-003 (tradename, manufactured by Nippon Shokubai Kagaku Kogyo Co., Ltd.).

The inks prepared in Examples E12 to E14 were evaluated for the waterfastness, the storage stability thereof, and the antidrying/anticlogging property. For the ink prepared in Example E12, the above properties were estimated. The results were as summarized in the following table. From the results, it is apparent that the amount of the colorant is preferably 0.5 to 20% by weight based on the ink.

| Ex. | (1) Waterfastness | (2) Storage stability | (3) Clogging |
|---|---|---|---|
| E12 | A | A | A |
| E13 | A | A | B |
| E14 | B | B | B |

Example E15

An ink was prepared in the same manner as in Example E1, except that the amount of the cationic, water-soluble polymer was changed to 1 g of a polyethyleneimine SP-012 (tradename, manufactured by Nippon Shokubai Kagaku Kogyo Co., Ltd.).

Example E16

An ink was prepared in the same manner as in Example E1, except that the azole compound was changed to 15 g of 1,2,3-triazole.

Example E17

An ink was prepared in the same manner as in Example E1, except that the cationic, water-soluble polymer was changed to 0.75% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example E18

An ink was prepared in the same manner as in Example E1, except that the cationic, water-soluble polymer was changed to 0.75% by weight on a solid basis of a polyallylamine hydrochloride Danfix 723 (tradename, manufactured by Nitto Boseki Co., Ltd.) and 0.2 g of potassium hydroxide was further added.

Example E19

An ink was prepared in the same manner as in Example E1, except that the cationic, water-soluble polymer was changed to 0.5% by weight on a solid basis of a polyallylamine PAA-L (tradename, manufactured by Nitto Boseki Co., Ltd.) and 0.1 g of 1 N hydrochloric acid was further added.

The inks prepared in Examples E15 to E19 were evaluated for the waterfastness, the storage stability thereof, and the antidrying/anticlogging property. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| E15 | B | A | A |
| E16 | A | B | B |

-continued

| Ex. | (1) Waterfastness | (2) Storage stability | (3) Clogging |
|---|---|---|---|
| E17 | A | B | B |
| E18 | A | A | A |
| E19 | B | A | A |

Example E20

An ink was prepared in the same manner as in Example E1, except that the azole compound was changed to 5 g of 1,2,3-thiadiazole, the amount of Kayarus Direct Black G was changed to 0.5 g, the cationic, water-soluble polymer was changed to 0.1% by weight on a solid basis of a polydiallylamine PAS-H-5L (tradename, manufactured by Nitto Boseki Co., Ltd.), and 1 g of 2-(dimethylamino) ethanol was further added.

Example E21

An ink was prepared in the same manner as in Example E1, except that the amount of the ultrapure water to be initially charged was changed to 30 g, the amount of 1,2,4-triazole was changed to 20 g, the amount of Kayarus Direct Black G was changed to 3 g, and the cationic, water-soluble polymer was changed to 10 g of a polyethyleneimine, Epomin SP-018 (tradename, manufactured by Nippon Shokubai Kagaku Kogyo Co., Ltd.).

Example E22

An ink was prepared in the same manner as in Example E1, except that the amount of the ultrapure water to be initially charged was changed to 30 g, the amount of 1,2,4-triazole was changed to 30 g, the amount of Kayarus Direct Black G was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples E20 to E22 were evaluated for the waterfastness, the storage stability thereof, and the antidrying/anticlogging property. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
|---|---|---|---|
| E20 | A | A | B |
| E21 | A | B | A |
| E22 | A | B | A |

Example E23

An ink was prepared in the same manner as in Example E1, except that the amount of 1,2,4-triazole was changed to 1 g and the amount of Kayarus Direct Black G was changed to 0.5 g.

Example E24

An ink was prepared in the same manner as in Example E1, except that the amount of the ultrapure water to be initially charged was changed to 30 g, the amount of 1,2,4-triazole was changed to 20 g, and the amount of Kayarus Direct Black G was changed to 2 g.

Example E25

An ink was prepared in the same manner as in Example E1, except that the amount of the ultrapure water to be initially charged was changed to 30 g, the amount of 1,2,4-triazole was changed to 40 g, and the amount of Kayarus Direct Black G was changed to 5 g.

The inks prepared in Examples E23 to E25 were evaluated for the waterfastness, the storage stability thereof, and the antidrying/anticlogging property. The results were as summarized in the following table. From the results, it is apparent that the amount of the azole compound added is preferably 1 to 40% by weight based on the ink.

| Ex. | (1) Waterfastness | (2) Storage stability | (3) Clogging |
| --- | --- | --- | --- |
| E23 | A | A | A |
| E24 | A | A | A |
| E25 | B | A | A |

Example E26

An ink was prepared in the same manner as in Example E1, except that the amount of 1,2,4-triazole was changed to 10 g and 10 g of glycerin was further added as a humectant.

Example E27

An ink was prepared in the same manner as in Example E1, except that the amount of 1,2,4-triazole was changed to 10 g and 10 g of maltitol was added as a humectant.

Example E28

An ink was prepared in the same manner as in Example E1, except that the amount of 1,2,4-triazole was changed to 10 g and 10 g of thiodiglycol was added as a humectant.

The inks prepared in Examples E26 to E28 were evaluated for the waterfastness, the storage stability thereof, and the antidrying/anticlogging property. The results were as summarized in the following table. From the results, it is apparent that addition of a humectant is preferred.

| Ex. | (1) Waterfastness | (2) Storage stability | (3) Clogging |
| --- | --- | --- | --- |
| E26 | A | A | A |
| E27 | A | A | A |
| E28 | A | A | A |

Example E29

An ink was prepared in the same manner as in Example E1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 10 g of diethylene glycol monobutyl ether as a penetration accelerator were added.

Example E30

An ink was prepared in the same manner as in Example E1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example E31

An ink was prepared in the same manner as in Example E1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of glycerin as a humectant, 1Og of glycerin as a humectant and 10 g of diethylene glycol monobutyl ether and 0.8 g of a nonionic surfactant Surfynol 465 (tradename, manufactured by Air Products and Chemicals, Inc.) as penetration accelerators were added.

Example E32

An ink was prepared in the same manner as in Example E1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples E29 to E32 were evaluated for the waterfastness, the storage stability thereof, and the antidrying/anticlogging property. The results were as summarized in the following table. From the results, it is apparent that addition of a penetration accelerator is preferred.

| Ex. | (1) Waterfastness | (2) Storage stability | (3) Clogging |
| --- | --- | --- | --- |
| E29 | A | A | A |
| E30 | A | A | A |
| E31 | A | A | A |
| E32 | A | A | A |

A blotted image was printed, using the inks prepared in Examples E29 to E32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example E

Comparative Example E1

An ink was prepared in the same manner as in Example E1, except that 15 g of urea was used instead of 1,2,4-triazole and, in addition, 10 g of glycerin was added.

Comparative Example E2

An ink was prepared in the same manner as in Example E1, except that 15 g of thiourea was used instead of 1,2,4-triazole and, in addition, 10 g of glycerin was added.

Comparative Example E3

An ink was prepared in the same manner as in Example E1, except that 30 g of urea was used instead of 1,2,4-triazole and, in addition, 10 g of glycerin was added.

Comparative Example E4

An ink was prepared in the same manner as in Example E1, except that polyvinyl amine was changed to ultrapure water.

The inks prepared in these comparative examples were evaluated for the waterfastness, the storage stability thereof, and the antidrying/anticlogging property. The results were as summarized in the following table.

| Comp. Ex. | (1) Waterfastness | (2) Storage stability | (3) Clogging |
|---|---|---|---|
| E1 | A | A | D |
| E2 | A | A | D |
| E3 | A | A | C |
| E4 | C | A | A |

Example F

Example F1

Pyridazine (15 g) as an azine compound was dissolved in 50 g of ultrapure water. Further, 1.5 g of Kayarus Direct Black G (tradename, manufactured by Nippon Kayaku Co., Ltd., C.I. Direct Black 19) as a colorant was dissolved in the solution to prepare a dye solution. The polyvinylamine (0.5 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of about 5 μm to prepare an ink.

Example F2

Direct Fast Yellow GC (tradename, manufactured by Sumitomo Chemical Co., Ltd., C.I. Direct Yellow 44) (2.5 g) as a colorant was dissolved in 50 g of ultrapure water to prepare a dye solution. Cytosine (15 g) as an azine compound and a polyallylamine PAA-10C (tradename, manufactured by Nitto Boseki Co., Ltd.) as a cationic, water-soluble polymer in an amount of 1% by weight on a solid basis were added to the dye solution with stirring, and, in addition, ultrapure water was added thereto to a total solution weight of 100 g, followed by mixing with stirring. The solution was then passed through a metal mesh filter having a pore diameter of about 5 μm to prepare an ink.

Example F3

Pyrazine (15 g) as an azine compound was dissolved in 50 g of ultrapure water. Further, 2 g of Kayaku Acid Rhodamine FB (tradename, manufactured by Nippon Kayaku Co., Ltd., C.I. Acid Red 52) as a colorant was dissolved in the solution to prepare a dye solution. A polyethyleneimine SP-012 (tradename, manufactured by Nippon Shokubai Kagaku Kogyo Co., Ltd.) (1 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of about 5 μm to prepare an ink.

Example F4

Kayarus Turquoise Blue GL (tradename, manufactured by Nippon Kayaku Co., Ltd., C.I. Direct Blue 86) (2 g) as a colorant was dissolved in 50 g of ultrapure water to prepare a dye solution. A polyallylamine PAA-10C (tradename, manufactured by Nitto Boseki Co., Ltd.) as a cationic, water-soluble polymer in an amount of 0.75% by weight on a solid basis and 15 g of 4-pyridazinecarboxylic acid as an azine compound were added to the dye solution with stirring, and, in addition, ultrapure water was added thereto to a total solution weight of 100 g, followed by mixing with stirring. The solution was then passed through a metal mesh filter having a pore diameter of about 5 μm to prepare an ink.

The inks prepared in Examples F1 to F4 were evaluated for the waterfastness, the storage stability thereof, and the antidrying/anticlogging property. For the ink prepared in Examples F2 and F4, the above properties were estimated. The results were as summarized in the following table.

| Ex. | (1) Waterfastness | (2) Storage stability | (3) Clogging |
|---|---|---|---|
| F1 | A | A | A |
| F2 | A | A | A |
| F3 | A | A | A |
| F4 | A | A | A |

Example F5

An ink was prepared in the same manner as in Example F1, except that the colorant was changed to 1.5 g of Suminol Fast Black BR (tradename, manufactured by Sumitomo Chemical Co., Ltd., C.I. Acid Black 31).

Example F6

An ink was prepared in the same manner as in Example F1, except that the colorant was changed to 2 g of Mikethren Soluble Blue O (tradename, manufactured by Mitsui Toatsu Chemicals, Inc., C.I. Solubilized Vat Blue 1) and the amount of the polyvinylamine, synthesized in Preparation 1, used was changed to 0.75 g.

Example F7

An ink was prepared in the same manner as in Example F1, except that the colorant was changed to 2 g of Sumifix Brilliant Blue R (tradename, manufactured by Sumitomo Chemical Co., Ltd., C.I. Reactive Blue 19) and the amount of the polyvinylamine, synthesized in Preparation 2, used was changed to 0.75 g.

Example F8

An ink was prepared in the same manner as in Example F1, except that the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 1, used was changed to 1 g.

Example F9

An ink was prepared in the same manner as in Example F1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 1% by weight on a solid basis of a polyallylamine PAA-10C (tradename, manufactured by Nitto Boseki Co., Ltd.).

Example F10

An ink was prepared in the same manner as in Example F1, except that the colorant was changed to 2.5 g of Zapon Fast Yellow CGG (tradename, manufactured by BASF, C.I. Solvent Yellow 15), 1% by weight on a solid basis of a polyallylamine PAA-10C (tradename, manufactured by Nitto Boseki Co., Ltd.) was added as the cationic, water-soluble polymer, and 0.3 g of potassium hydroxide was further added.

Example F11

An ink was prepared in the same manner as in Example F1, except that the colorant was changed to 2 g of Pink 6G (tradename, manufactured by Noma Kagaku Kogyo K.K., C.I. Pigment Red 81) and the amount of the polyvinylamine synthesized in Preparation 1 was changed to 1 g, and 0.5 g of potassium hydroxide was further added.

The inks prepared in Examples F5 to F11 were evaluated for the waterfastness, the storage stability thereof, and the antidrying/anticlogging property. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| F5 | A | A | A |
| F6 | B | A | B |
| F7 | A | B | A |
| F8 | B | A | A |
| F9 | A | B | B |
| F10 | A | B | B |
| F11 | A | B | B |

Example F12

An ink was prepared in the same manner as in Example F1, except that the azine compound was changed to 5 g of cytosine-5-carboxylic acid, the amount of Kayarus Direct Black G was changed to 0.5 g, and the amount of the polyvinylamine synthesized in Preparation 1 was changed to 0.2 g.

Example F13

An ink was prepared in the same manner as in Example F1, except that the colorant was changed to 10 g of Suminol Fast Black BR (tradename, manufactured by Sumitomo Chemical Co., Ltd., C.I. Acid Black 31) and the cationic, water-soluble polymer was changed to 10 g of a polyethyleneimine SP-012 (tradename, manufactured by Nippon Shokubai Kagaku Kogyo Co., Ltd.).

Example F14

An ink was prepared in the same manner as in Example F1, except that the amount of pyridazine was changed to 20 g, the colorant was changed to 20 g of Suminol Fast Black BR (tradename, manufactured by Sumitomo Chemical Co., Ltd., C.I. Acid Black 31), and the cationic, water-soluble polymer was changed to 20 g of a polyethyleneimine SP-003 (tradename, manufactured by Nippon Shokubai Kagaku Kogyo Co., Ltd.).

The inks prepared in Examples F12 to F14 were evaluated for the waterfastness, the storage stability thereof, and the antidrying/anticlogging property. For the ink prepared in Example F12, the above properties were estimated. The results were as summarized in the following table. From the results, it is apparent that the amount of the colorant is preferably 0.5 to 20% by weight based on the ink.

| Ex. | (1) Waterfastness | (2) Storage stability | (3) Clogging |
|---|---|---|---|
| F12 | A | A | B |
| F13 | A | A | B |
| F14 | B | B | B |

Example F15

An ink was prepared in the same manner as in Example F1, except that the cationic, water-soluble polymer was changed to 1 g of a polyethyleneimine SP-012 (tradename, manufactured by Nippon Shokubai Kagaku Kogyo Co., Ltd.).

Example F16

An ink was prepared in the same manner as in Example F1, except that the azine compound was changed to 15 g of pyrazine-2,3-dicarboxylic acid.

Example F17

An ink was prepared in the same manner as in Example F1, except that the cationic, water-soluble polymer was changed to 0.75% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example F18

An ink was prepared in the same manner as in Example F1, except that the cationic, water-soluble polymer was changed to 0.75% by weight on a solid basis of a polyallylamine hydrochloride Danfix 723 (tradename, manufactured by Nitto Boseki Co., Ltd.) and 0.2 g of potassium hydroxide was further added.

Example F19

An ink was prepared in the same manner as in Example F1, except that the cationic, water-soluble polymer was changed to 1% by weight on a solid basis of a polyallylamine PAA-L (tradename, manufactured by Nitto Boseki Co., Ltd.) and 0.1 g of 1 N hydrochloric acid was further added.

The inks prepared in Examples F15 to F19 were evaluated for the waterfastness, the storage stability thereof, and the antidrying/anticlogging property. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
| --- | --- | --- | --- |
| F15 | B | A | A |
| F16 | A | B | B |
| F17 | A | B | A |
| F18 | A | A | A |
| F19 | A | A | B |

Example F20

An ink was prepared in the same manner as in Example F1, except that the amount of pyridazine was changed to 5 g, the amount of Kayarus Direct Black G was changed to 0.5 g, the cationic, water-soluble polymer was changed to 0.1% by weight on a solid basis of a polydiallyamine PAS-H-5L (tradename, manufactured by Nitto Boseki Co., Ltd.), and 1 g of 2-(dimethylamino)ethanol was further added.

Example F21

An ink was prepared in the same manner as in Example F1, except that the amount of the ultrapure water to be initially charged was changed to 30 g, the amount of pyridazine was changed to 20 g, the amount of Kayarus Direct Black G was changed to 3 g, and the cationic, water-soluble polymer was changed to 10 g of a polyethyleneimine, Epomin SP-018 (tradename, manufactured by Nippon Shokubai Kagaku Kogyo Co., Ltd.).

Example F22

An ink was prepared in the same manner as in Example F1, except that the amount of the ultrapure water to be initially charged was changed to 30 g, the azine compound was changed to 30 g of hexahydropyrazine, the amount of Kayarus Direct Black G was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples F20 to F22 were evaluated for the waterfastness, the storage stability thereof, and the antidrying/anticlogging property. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
| --- | --- | --- | --- |
| F20 | A | A | A |
| F21 | A | B | A |
| F22 | A | B | B |

Example F23

An ink was prepared in the same manner as in Example F1, except that the amount of pyridazine was changed to 1 g and the amount of Kayarus Direct Black G was changed to 0.5 g.

Example F24

An ink was prepared in the same manner as in Example F1, except that the amount of the ultrapure water to be initially charged was changed to 30 g, the amount of pyridazine was changed to 20 g, and the amount of Kayarus Direct Black G was changed to 2 g.

Example F25

An ink was prepared in the same manner as in Example F1, except that the amount of the ultrapure water to be initially charged was changed to 30 g, the amount of pyridazine was changed to 40 g, and the amount of Kayarus Direct Black G was changed to 5 g.

The inks prepared in Examples F23 to F25 were evaluated for the waterfastness, the storage stability thereof, and the antidrying/anticlogging property. The results were as summarized in the following table. From the results, it is apparent that the amount of the azine compound added is preferably 1 to 40% by weight based on the ink.

| Ex. | (1) Waterfastness | (2) Storage stability | (3) Clogging |
| --- | --- | --- | --- |
| F23 | A | A | A |
| F24 | A | A | A |
| F25 | B | A | A |

Example F26

An ink was prepared in the same manner as in Example F1, except that the amount of pyridazine was changed to 10 g and 10 g of glycerin was further added as a humectant.

Example F27

An ink was prepared in the same manner as in Example F1, except that the amount of pyridazine was changed to 10 g and 10 g of maltitol was added as a humectant.

Example F28

An ink was prepared in the same manner as in Example F1, except that the amount of pyridazine was changed to 10 g and 10 g of thiodiglycol was added as a humectant.

The inks prepared in Examples F26 to F28 were evaluated for the waterfastness, the storage stability thereof, and the antidrying/anticlogging property. The results were as summarized in the following table. From the results, it is apparent that addition of a humectant is preferred.

| Ex. | (1) Waterfastness | (2) Storage stability | (3) Clogging |
| --- | --- | --- | --- |
| F26 | A | A | A |
| F27 | A | A | A |
| F28 | A | A | A |

Example F29

An ink was prepared in the same manner as in Example F1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 10 g of diethylene glycol monobutyl ether as a penetration accelerator were added.

Example F30

An ink was prepared in the same manner as in Example F1, except that the amount of Kayarus Direct Black G was changed to 4 g, the cationic, water-soluble polymer was changed to 2% by weight on a solid basis of a polydiallylamine PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example F31

An ink was prepared in the same manner as in Example F1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example F32

An ink was prepared in the same manner as in Example F1, except that the amount of the ultrapure water to be initially charged was changed to 30 g, the amount of Kayarus Direct Black G was changed to 6 g, the cationic, water-soluble polymer was changed to 3% by weight on a solid basis of a polydiallylamine PAS-A-1 (tradename, manufactured by Nitto Boseki Co., Ltd.), and, in addition, 0.4 g of potassium hydroxide, 10 g of diethylene glycol as a humectant, and 10 g of triethylene glycol monobutyl ether and 0.5 g of a nonionic surfactant Olfine STG (tradename, manufactured by Air Products and Chemicals, Inc.) as penetration accelerators were added.

The inks prepared in Examples F29 to F32 were evaluated for the waterfastness, the storage stability thereof, and the antidrying/anticlogging property. The results were as summarized in the following table. From the results, it is apparent that addition of a penetration accelerator is preferred.

| Ex. | (1)<br>Waterfastness | (2)<br>Storage stability | (3)<br>Clogging |
|---|---|---|---|
| F29 | A | A | A |
| F30 | A | A | A |
| F31 | A | A | A |
| F32 | A | A | A |

A blotted image was printed, using the inks prepared in Examples F29 to F32, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example F

Comparative Example F1

An ink was prepared in the same manner as in Example F1, except that 15 g of urea was used instead of pyridazine as the azine compound and, in addition, 10 g of glycerin was added.

Comparative Example F2

An ink was prepared in the same manner as in Example F1, except that 15 g of thiourea was used instead of pyridazine as the azine compound and, in addition, 10 g of glycerin was added.

Comparative Example F3

An ink was prepared in the same manner as in Example F1, except that 30 g of urea was used instead of pyridazine as the azine compound and, in addition, 10 g of glycerin was added.

Comparative Example F4

An ink was prepared in the same manner as in Example F1, except that polyvinyl amine was changed to ultrapure water.

The inks prepared in these comparative examples were evaluated for the waterfastness, the storage stability thereof, and the antidrying/anticlogging property. The results were as summarized in the following table.

| Comp.<br>Ex. | (1)<br>Waterfastness | (2)<br>Storage stability | (3)<br>Clogging |
|---|---|---|---|
| F1 | A | A | D |
| F2 | A | A | D |
| F3 | A | A | C |
| F4 | C | A | A |

Example G

Example G1

Guanidine (15 g) as an amidine derivative was dissolved in 50 g of ultrapure water. Further, 5.0 g of Direct Fast Black AB (tradename, manufactured by Sumitomo Chemical Co., Ltd., C.I. Direct Black 32) as a colorant was dissolved in the solution to prepare a dye solution. The polyvinylamine (3.0 g) having a molecular weight of about 2,000 synthesized in Preparation 1 was added as a cationic, water-soluble polymer to the dye solution with stirring, and, in addition, ultrapure water was added thereto to a total solution weight of 100 g, followed by stirring. The solution was then passed through a metal mesh filter having a pore diameter of about 5 $\mu$m to prepare an ink.

Example G2

Canavanine (15 g) as an amidine derivative was dissolved in 50 g of ultrapure water. Further, 2.5 g of Direct Fast Yellow R (tradename, manufactured by Sumitomo Chemical Co., Ltd., C.I. Direct Yellow 50) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare an ink.

Example G3

Arginosuccinic acid (15 g) as an amidine derivative was dissolved in 50 g of ultrapure water. Further, 2 g of Nippon Fast Red BB (tradename, manufactured by Sumitomo Chemical Co., Ltd., C.I. Direct Red 31) as a colorant was dissolved in the solution to prepare a dye solution. A polyethyleneimine SP-012 (tradename, manufactured by Nippon Shokubai Kagaku Kogyo Co., Ltd.) (4 g) as a cationic, water-soluble polymer was added to the dye solution with stirring, and, in addition, ultrapure water was added thereto to a total solution weight of 100 g, followed by stirring. The solution was then passed through a metal mesh filter having a pore diameter of about 5 μm to prepare an ink.

Example G4

Kayarus Turquoise Blue GL (tradename, manufactured by Nippon Kayaku Co., Ltd., C.I. Direct Blue 86) (4.0 g) as a colorant was dissolved in 50 g of ultrapure water to prepare a dye solution. A polyallylamine PAA-10C (tradename, manufactured by Nitto Boseki Co., Ltd.) as a cationic, water-soluble polymer in an amount of 1.5% by weight on a solid basis and 15 g of guanidinoacetic acid as an amidine derivative were added to the dye solution with stirring, and, in addition, ultrapure water was added thereto to a total solution weight of 100 g, followed by stirring. The solution was then passed through a metal mesh filter having a pore diameter of about 5 μm to prepare an ink.

The inks prepared in Examples G1 to G4 were evaluated for the waterfastness, the storage stability thereof, and the antidrying/anticlogging property. For the ink prepared in Example G4, the above properties were estimated. The results were as summarized in the following table.

| Ex. | (1) Waterfastness | (2) Storage stability | (3) Clogging |
|---|---|---|---|
| G1 | A | A | A |
| G2 | A | A | A |
| G3 | A | A | A |
| G4 | A | A | A |

Example G5

An ink was prepared in the same manner as in Example G1, except that the colorant was changed to 3.0 g of Nigrosine NB (tradename, manufactured by Sumitomo Chemical Co., Ltd., C.I. Acid Black 2).

Example G6

An ink was prepared in the same manner as in Example G1, except that the colorant was changed to 3. 5 g of Mikethren Soluble Blue O (tradename, manufactured by Mitsui Toatsu Chemicals, Inc., C.I. Solubilized Vat Blue 1) and the amount of the polyvinylamine having a molecular weight of about 5,000, synthesized in Preparation 2, used was changed to 1.5 g.

Example G7

An ink was prepared in the same manner as in Example G1, except that the colorant was changed to 2 g of Sumifix Brilliant Blue R (tradename, manufactured by Sumitomo Chemical Co., Ltd., C.I. Reactive Blue 19) and the cationic, water-soluble polymer was changed to 2.5% by weight on a solid basis of a polyallylamine PAA-L (tradename, manufactured by Nitto Boseki Co., Ltd.).

Example G8

An ink was prepared in the same manner as in Example G1, except that the amidine derivative was changed to 15 g of aminoguanidine, the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 2, used was changed to 2 g.

Example G9

An ink was prepared in the same manner as in Example G1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 2% by weight on a solid basis of a polyallylamine PAA-10C (tradename, manufactured by Nitto Boseki Co., Ltd.).

Example G10

An ink was prepared in the same manner as in Example G1, except that the amidine derivative was changed to 15 g of biguanide, the colorant was changed to 2.5 g of Zapon Fast Yellow CGG (tradename, manufactured by BASF, C.I. Solvent Yellow 15), the cationic, water-soluble polymer was changed to 1.5% by weight on a solid basis of a polyallylamine hydrochloride Danfix 723 (tradename, manufactured by Nitto Boseki Co., Ltd.), and 0.7 g of potassium hydroxide was further added.

Example G11

An ink was prepared in the same manner as in Example G1, except that the colorant was changed to 2.5 g of Pink 6G (tradename, manufactured by Noma Kagaku Kogyo K.K., C.I. Pigment Red 81), the cationic, water-soluble polymer was changed to 2.5% by weight on a solid basis of a polyallylamine hydrochloride Danfix 723 (tradename, manufactured by Nitto Boseki Co., Ltd.), and 1.2 g of sodium hydroxide was further added.

The inks prepared in Examples G5 to G11 were evaluated for the waterfastness, the storage stability thereof, and the antidrying/anticlogging property. For the ink prepared in Example G10, the above properties were estimated. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|---|---|---|---|
| G5 | A | A | A |
| G6 | A | A | A |
| G7 | A | B | A |
| G8 | A | A | A |
| G9 | A | B | A |

-continued

| Ex. | (1) Waterfastness | (2) Storage stability | (3) Clogging |
|---|---|---|---|
| G10 | A | B | B |
| G11 | A | A | A |

Example G12

An ink was prepared in the same manner as in Example G1, except that the amount of guanidine was changed to 5 g, the amount of Direct Fast Black AB was changed to 0.5 g, and the amount of the polyvinylamine synthesized in Preparation 1 was changed to 0.3 g.

Example G13

An ink was prepared in the same manner as in Example G1, except that the amount of Direct Fast Black AB was changed to 10 g and the cationic, water-soluble polymer was changed to 10 g of a polyethyleneimine SP-012 (tradename, manufactured by Nippon Shokubai Kagaku Kogyo Co., Ltd.).

Example G14

An ink was prepared in the same manner as in Example G1, except that the amount of guanidine was changed to 20 g, the amount of Direct Fast Black AB was changed to 20 g, and the cationic, water-soluble polymer was changed to 10% by weight on a solid basis of a polyallylamine PAA-10C (tradename, manufactured by Nitto Boseki Co., Ltd.) and 5% by weight on a solid basis of a polyallylamine hydrochloride Danfix 723 (tradename, manufactured by Nitto Boseki Co., Ltd.).

The inks prepared in Examples G12 to G14 were evaluated for the waterfastness, the storage stability thereof, and the antidrying/anticlogging property. The results were as summarized in the following table. From the results, it is apparent that the amount of the colorant used is preferably 0.5 to 20% by weight based on the ink.

| Ex. | (1) Waterfastness | (2) Storage stability | (3) Clogging |
|---|---|---|---|
| G12 | A | A | A |
| G13 | A | B | B |
| G14 | B | B | B |

Example G15

An ink was prepared in the same manner as in Example G1, except that the amount of the cationic, water-soluble polymer was changed to 2.5 g of a polyethyleneimine SP-012 (tradename, manufactured by Nippon Shokubai Kagaku Kogyo Co., Ltd.).

Example G16

An ink was prepared in the same manner as in Example G1, except that the amidine derivative was changed to 10 g of arginine.

Example G17

An ink was prepared in the same manner as in Example G1, except that the cationic, water-soluble polymer was changed to 5% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example G18

An ink was prepared in the same manner as in Example G1, except that the cationic, water-soluble polymer was changed to 2% by weight on a solid basis of a polyallylamine hydrochloride Danfix 723 (tradename, manufactured by Nitto Boseki Co., Ltd.) and 0.7 g of potassium hydroxide was further added.

Example G19

An ink was prepared in the same manner as in Example G1, except that the cationic, water-soluble polymer was changed to 2% by weight on a solid basis of a polyallylamine PAA-L (tradename, manufactured by Nitto Boseki Co., Ltd.) and 0.1 g of 1 N hydrochloric acid was further added.

The inks prepared in Examples G15 to G19 were evaluated for the waterfastness, the storage stability thereof, and the antidrying/anticlogging property. For Example G16, the properties were estimated. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| G15 | A | B | A |
| G16 | A | A | B |
| G17 | B | A | B |
| G18 | A | A | A |
| G19 | B | A | A |

Example G20

An ink was prepared in the same manner as in Example G1, except that the amidine derivative was changed to 5 g of sulfaguanidine, the amount of Direct Fast Black AB was changed to 0.5 g, the cationic, water-soluble polymer was changed to 0.1% by weight on a solid basis of a polydiallylamine PAS-H-5L (tradename, manufactured by Nitto Boseki Co., Ltd.), and 2 g of 2-(dimethylamino)ethanol was further added.

Example G21

An ink was prepared in the same manner as in Example G1, except that the amount of the ultrapure water to be initially charged was changed to 30 g, the amount of guanidine was changed to 20 g, the amount of Direct Fast Black AB was changed to 3 g, and the cationic, water-soluble polymer was changed to 10% by weight on a solid basis of a polyallylamine PAA-10C (tradename, manufactured by Nitto Boseki Co., Ltd.).

Example G22

An ink was prepared in the same manner as in Example G1, except that the amount of the ultrapure water to be initially charged was changed to 30 g, the amount of guanidine was changed to 30 g, the amount of Direct Fast Black AB was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples G20 to G22 were evaluated for the waterfastness, the storage stability thereof, and the antidrying/anticlogging property. For the ink prepared in Example G20, the above properties were estimated. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
|---|---|---|---|
| G20 | A | A | B |
| G21 | A | A | A |
| G22 | A | B | A |

Example G23

An ink was prepared in the same manner as in Example G1, except that the amount of guanidine was changed to 1 g and the colorant was changed to 0.5 g of Nigrosine NB (tradename, manufactured by Sumitomo Chemical Co., Ltd., C.I. Acid Black 2).

Example G24

An ink was prepared in the same manner as in Example G1, except that the amount of the ultrapure water to be initially charged was changed to 30 g, the amount of guanidine was changed to 20 g, and the colorant was changed to 2 g of Nigrosine NB (tradename, manufactured by Sumitomo Chemical Co., Ltd., C.I. Acid Black 2).

Example G25

An ink was prepared in the same manner as in Example G1, except that the amount of the ultrapure water to be initially charged was changed to 30 g, the amount of guanidine was changed to 40 g, and the colorant was changed to 5 g of Nigrosine NB (tradename, manufactured by Sumitomo Chemical Co., Ltd., C.I. Acid Black 2).

The inks prepared in Examples G23 to G25 were evaluated for the waterfastness, the storage stability thereof, and the antidrying/anticlogging property. The results were as summarized in the following table. From the results, it is apparent that the amount of the amidine derivative added is preferably 1 to 40% by weight based on the ink.

| Ex. | (1) Waterfastness | (2) Storage stability | (3) Clogging |
|---|---|---|---|
| G23 | A | A | A |
| G24 | A | A | A |
| G25 | B | A | A |

Example G26

An ink was prepared in the same manner as in Example G2, except that the amidine derivative was changed to 10 g of 1-amyl-3-nitro-1-nitrosoguanidine and 10 g of glycerin was added as a humectant.

Example G27

An ink was prepared in the same manner as in Example G2, except that the amidine derivative was changed to 10 g of 1-methyl-3-nitro-1-nitrosoguanidine and 10 g of maltitol was added as a humectant.

Example G28

An ink was prepared in the same manner as in Example G2, except that the amidine derivative was changed to 10 g of nitrosoguanidine and 10 g of thiodiglycol was added as a humectant.

For the inks prepared in Examples G26 to G28, the waterfastness, the storage stability thereof, and the antidrying/anticlogging property were estimated. The results were as follows.

| Ex. | (1) Waterfastness | (2) Storage stability | (3) Clogging |
|---|---|---|---|
| G26 | A | A | A |
| G27 | A | A | A |
| G28 | A | A | A |

Example G29

An ink was prepared in the same manner as in Example G1, except that the amount of Direct Fast Black AB was changed to 4 g, the cationic, water-soluble polymer was changed to 2.5% by weight on a solid basis of a polyallylamine hydrochloride Danfix 723 (tradename, manufactured by Nitto Boseki Co., Ltd.), and, in addition, 5 g of 2-(dimethylamino)ethanol and 10 g of diethylene glycol monobutyl ether as a penetration accelerator were added.

Example G30

An ink was prepared in the same manner as in Example G1, except that the amount of Direct Fast Black AB was changed to 4 g, the cationic, water-soluble polymer was changed to 4% by weight on a solid basis of a copolymer of a diallylamine with sulfur dioxide, PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example G31

An ink was prepared in the same manner as in Example G1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-M-1 (tradename, manufactured by Nitto Boseki Co., Ltd.), and, in addition, 0.9 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example G32

An ink was prepared in the same manner as in Example G1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-5 (tradename, manufactured by Nitto Boseki Co., Ltd.), and, in addition, 0.5 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples G29 to G32 were evaluated for the waterfastness, the storage stability thereof, and the antidrying/anticlogging property. The results were as summarized in the following table. From the results, it is apparent that addition of a penetration accelerator is preferred.

| Ex. | (1) Waterfastness | (2) Storage stability | (3) Clogging |
|---|---|---|---|
| G29 | A | A | A |
| G30 | A | A | A |
| G31 | A | A | A |
| G32 | A | A | A |

A blotted image was printed, using the inks prepared in Examples G29 to G32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example G

Comparative Example G1

An ink was prepared in the same manner as in Example G1, except that 15 g of urea was used instead of guanidine as the amidine derivative and, in addition, 10 g of glycerin was added.

Comparative Example G2

An ink was prepared in the same manner as in Example G1, except that 15 g of thiourea was used instead of guanidine as the amidine derivative and, in addition, 10 g of glycerin was added.

Comparative Example G3

An ink was prepared in the same manner as in Example G1, except that 30 g of urea was used instead of guanidine as the amidine derivative and, in addition, 10 g of glycerin was added.

Comparative Example G4

An ink was prepared in the same manner as in Example G1, except that polyvinyl amine was changed to ultrapure water.

The inks prepared in these comparative examples were evaluated for the waterfastness, the storage stability thereof, and the antidrying/anticlogging property. The results were as summarized in the following table.

| Comp. Ex. | (1) Waterfastness | (2) Storage stability | (3) Clogging |
|---|---|---|---|
| G1 | A | A | D |
| G2 | A | A | D |
| G3 | A | A | C |
| G4 | C | A | A |

Example H

Example H1

Direct Fast Black AB (tradename, manufactured by Sumitomo Chemical Co., Ltd., C.I. Direct Black 32) (5.0 g) as a colorant was dissolved in 50 g of ultrapure water to prepare a dye solution. The polyvinylamine (3.0 g) having a molecular weight of about 2,000, as a cationic, water-soluble polymer, synthesized in Preparation 1 and 15 g of guanine as a purine derivative were added to the dye solution with stirring, and, in addition, ultrapure water was added thereto to a total solution weight of 100 g, followed by stirring. The solution was then passed through a metal mesh filter having a pore diameter of about 5 $\mu$m to prepare an ink.

Example H2

Purine (15 g) as a purine derivative was dissolved in 50 g of ultrapure water. Further, 2.5 g of Direct Fast Yellow R (tradename, manufactured by Sumitomo Chemical Co., Ltd., C.I. Direct Yellow 50) as a colorant was dissolved in the solution to prepare a dye solution. A polyallylamine PAA-10C (tradename, manufactured by Nitto Boseki Co., Ltd.) as a cationic, water-soluble polymer was added in an amount of 1.5% by weight on a solid basis to the dye solution with stirring, and, in addition, ultrapure water was added thereto to a total solution weight of 100 g, followed by stirring. The solution was then passed through a metal mesh filter having a pore diameter of about 5 $\mu$m to prepare an ink.

Example H3

Nippon Fast Red BB (tradename, manufactured by Sumitomo Chemical Co., Ltd., C.I. Direct Red 31) (2 g) as a colorant was dissolved in 50 g of ultrapure water to prepare a dye solution. A polyethyleneimine SP-012 (tradename, manufactured by Nippon Shokubai Kagaku Kogyo Co., Ltd.) (4 g) as a cationic, water-soluble polymer and 15 g of xanthine as a purine derivative were added to the dye solution with stirring, and, in addition, ultrapure water was added thereto to a total solution weight of 100 g, followed by stirring. The solution was then passed through a metal mesh filter having a pore diameter of about 5 $\mu$m to prepare an ink.

Example H4

Adenosine (15 g) as a purine derivative was dissolved in 50 g of ultrapure water. Further, Kayarus Turquoise Blue GL (tradename, manufactured by Nippon Kayaku Co., Ltd., C.I. Direct Blue 86) (4.0 g) as a colorant was dissolved in the solution to prepare a dye solution. A polyallylamine PAA-10C (tradename, manufactured by Nitto Boseki Co., Ltd.) as a cationic, water-soluble polymer in an amount of 1.5% by weight on a solid basis was added to the dye solution with stirring, and, in addition, ultrapure water was added thereto to a total solution weight of 100 g, followed by stirring. The solution was then passed through a metal mesh filter having a pore diameter of about 5 $\mu$m to prepare an ink.

The inks prepared in Examples H1 to H4 were evaluated for the waterfastness, the storage stability thereof, and the antidrying/anticlogging property. The results were as summarized in the following table.

| Ex. | (1) Waterfastness | (2) Storage stability | (3) Clogging |
|-----|-------------------|----------------------|--------------|
| H1  | A                 | A                    | A            |
| H2  | A                 | A                    | A            |
| H3  | A                 | A                    | A            |
| H4  | A                 | A                    | A            |

Example H5

An ink was prepared in the same manner as in Example H1, except that the colorant was changed to 3.0 g of Nigrosine NB (tradename, manufactured by Sumitomo Chemical Co., Ltd., C.I. Acid Black 2).

Example H6

An ink was prepared in the same manner as in Example H1, except that the colorant was changed to 3.5 g of Mikethren Soluble Blue O (tradename, manufactured by Mitsui Toatsu Chemicals, Inc., C.I. Solubilized Vat Blue 1) and the amount of the polyvinylamine having a molecular weight of about 2,000, synthesized in Preparation 1, used was changed to 1.5 g.

Example H7

An ink was prepared in the same manner as in Example H1, except that the colorant was changed to 2 g of Sumifix Brilliant Blue R (tradename, manufactured by Sumitomo Chemical Co., Ltd., C.I. Reactive Blue 19) and the cationic, water-soluble polymer was changed to 2.5% by weight on a solid basis of a polyallylamine PAA-L (tradename, manufactured by Nitto Boseki Co., Ltd.).

Example H8

An ink was prepared in the same manner as in Example H1, except that the purine derivative was changed to 15 g of methylguanine, the colorant was changed to 2.5 g of Food Yellow No. 5 (tradename, manufactured by Hodogaya Chemical Co., Ltd., C.I. Food Yellow 3), and the amount of the polyvinylamine, synthesized in Preparation 2, used was changed to 3 g.

Example H9

An ink was prepared in the same manner as in Example H1, except that the colorant was changed to 2 g of Aizen Methylene Blue FZ (tradename, manufactured by Hodogaya Chemical Co., Ltd., C.I. Basic Blue 9) and the cationic, water-soluble polymer was changed to 2% by weight on a solid basis of a polyallylamine PAA-10C (tradename, manufactured by Nitto Boseki Co., Ltd.).

Example H10

An ink was prepared in the same manner as in Example H1, except that the purine derivative was changed to 15 g of caffeine, the colorant was changed to 2.5 g of Zapon Fast Yellow CGG (tradename, manufactured by BASF, C.I. Solvent Yellow 15), the cationic, water-soluble polymer was changed to 1.5% by weight on a solid basis of a polyallylamine hydrochloride Danfix 723 (tradename, manufactured by Nitto Boseki Co., Ltd.), and 0.7 g of potassium hydroxide was further added.

Example H11

An ink was prepared in the same manner as in Example H1, except that the colorant was changed to 2.5 g of Pink 6G (tradename, manufactured by Noma Kagaku Kogyo K.K., C.I. Pigment Red 81), the cationic, water-soluble polymer was changed to 2.5% by weight on a solid basis of a polyallylamine hydrochloride Danfix 723 (tradename, manufactured by Nitto Boseki Co., Ltd.), and 1.2 g of sodium hydroxide was further added.

The inks prepared in Examples H5 to H11 were evaluated for the waterfastness, the storage stability thereof, and the antidrying/anticlogging property. For the ink prepared in Examples H8 and H10, the above properties were estimated. The results were as summarized in the following table. From the results, it is apparent that not only dyes belonging to the category of water-soluble acid dyes, direct dyes, reactive dyes, soluble vat dyes, food dyes, and basic dyes but also water-insoluble, oil-soluble dyes and pigments may be utilized as the colorant so far as they are soluble in an alkali.

| Ex. | (1) Waterfastness | (2) Storage stability | (3) Clogging |
|-----|-------------------|----------------------|--------------|
| H5  | A                 | A                    | A            |
| H6  | B                 | A                    | B            |
| H7  | A                 | B                    | A            |
| H8  | A                 | A                    | A            |
| H9  | A                 | B                    | A            |
| H10 | A                 | B                    | B            |
| H11 | A                 | A                    | A            |

Example H12

An ink was prepared in the same manner as in Example H1, except that the amount of guanine was changed to 5 g, the amount of Direct Fast Black AB was changed to 0.5 g, and the amount of the polyvinylamine synthesized in Preparation 1 was changed to 0.3 g.

Example H13

An ink was prepared in the same manner as in Example H1, except that the amount of Direct Fast Black AB was changed to 10 g and the cationic, water-soluble polymer was changed to 10 g of a polyethyleneimine SP-012 (tradename, manufactured by Nippon Shokubai Kagaku Kogyo Co., Ltd.).

Example H14

An ink was prepared in the same manner as in Example H1, except that the amount of guanine was changed to 20 g, the amount of Direct Fast Black AB was changed to 20 g, and the cationic, water-soluble polymer was changed to 10% by weight on a solid basis of a polyallylamine PAA-10C (tradename, manufactured by Nitto Boseki Co., Ltd.) and 5% by weight on a solid basis of a polyallylamine hydrochloride Danfix 723 (tradename, manufactured by Nitto Boseki Co., Ltd.).

The inks prepared in Examples H12 to H14 were evaluated for the waterfastness, the storage stability thereof, and the antidrying/anticlogging property. The results were as summarized in the following table. From the results, it is apparent that the amount of the colorant used is preferably 0.5 to 20% by weight based on the ink.

| Ex. | (1) Waterfastness | (2) Storage stability | (3) Clogging |
|---|---|---|---|
| H12 | A | A | A |
| H13 | A | B | B |
| H14 | B | B | B |

Example H15

An ink was prepared in the same manner as in Example H1, except that the amount of the cationic, water-soluble polymer was changed to 2.5 g of a polyethyleneimine SP-012 (tradename, manufactured by Nippon Shokubai Kagaku Kogyo Co., Ltd.).

Example H16

An ink was prepared in the same manner as in Example H1, except that the purine derivative was changed to 15 g of 2'-deoxyguanosine.

Example H17

An ink was prepared in the same manner as in Example H1, except that the cationic, water-soluble polymer was changed to 5% by weight on a solid basis of a copolymer of a diallylamine with sulfur dioxide, PAS-A-1 (tradename, manufactured by Nitto Boseki Co., Ltd.) and 0.1 g of potassium hydroxide was further added.

Example H18

An ink was prepared in the same manner as in Example H1, except that the cationic, water-soluble polymer was changed to 2% by weight on a solid basis of a polyallylamine hydrochloride Danfix 723 (tradename, manufactured by Nitto Boseki Co., Ltd.) and 0.7 g of potassium hydroxide was further added.

Example H19

An ink was prepared in the same manner as in Example H1, except that the cationic, water-soluble polymer was changed to 2% by weight on a solid basis of a polyallylamine PAA-L (tradename, manufactured by Nitto Boseki Co., Ltd.) and 0.1 g of 1 N hydrochloric acid was further added.

The inks prepared in Examples H15 to H19 were evaluated for the waterfastness, the storage stability thereof, and the antidrying/anticlogging property. For Example H16, the properties were estimated. The results were as summarized in the following table. From the results, it is apparent that a homopolymer having in its molecule at least a structure selected from ethyleneimine, vinylamine, allylamine, and diallylamine and a copolymer of ethyleneimine, vinylamine, allylamine, or diallylamine with sulfur dioxide are preferred as the cationic, water-soluble polymer. Further, it is apparent that an ink, which further comprises hydrochloric acid, can offer good results.

| Ex. | (1) Waterfastness | (2) Storage stability | (3) Clogging |
|---|---|---|---|
| H15 | B | B | A |
| H16 | A | A | B |
| H17 | B | A | B |
| H18 | A | A | A |
| H19 | B | A | A |

Example H20

An ink was prepared in the same manner as in Example H1, except that the purine derivative was changed to 5 g of 2-amino-6-mercaptopurine, the amount of Direct Fast Black AB was changed to 0.5 g, the cationic, water-soluble polymer was changed to 0.1% by weight on a solid basis of a polydiallylamine PAS-H-5L (tradename, manufactured by Nitto Boseki Co., Ltd.), and 2 g of 2-(dimethylamino) ethanol was further added.

Example H21

An ink was prepared in the same manner as in Example H1, except that the amount of the ultrapure water to be initially charged was changed to 30 g, the amount of guanine was changed to 20 g, the amount of Direct Fast Black AB was changed to 3 g, and the cationic, water-soluble polymer was changed to 10% by weight on a solid basis of a polyallylamine PAA-10C (tradename, manufactured by Nitto Boseki Co., Ltd.).

Example H22

An ink was prepared in the same manner as in Example H1, except that the amount of the ultrapure water to be initially charged was changed to 30 g, the amount of guanine was changed to 30 g, the amount of Direct Fast Black AB was changed to 5 g, and the cationic, water-soluble polymer was changed to 20 g of a polyethyleneimine, Epomin SP-003 (tradename, manufactured by Nippon Shokubai Kagaku Kogyo Co., Ltd.).

The inks prepared in Examples H20 to H22 were evaluated for the waterfastness, the storage stability thereof, and the antidrying/anticlogging property. For the ink prepared in Example H20, the above properties were estimated. The results were as summarized in the following table. From the results, it is apparent that the amount of the cationic, water-soluble polymer added is preferably 0.1 to 20% by weight based on the ink.

| Ex. | (1) Waterfastness | (2) Storage stability | (3) Clogging |
|---|---|---|---|
| H20 | A | A | B |
| H21 | A | A | A |
| H22 | A | B | A |

Example H23

An ink was prepared in the same manner as in Example H1, except that the amount of guanine was changed to 1 g and the colorant was changed to 0.5 g of Nigrosine NB (tradename, manufactured by Sumitomo Chemical Co., Ltd., C.I. Acid Black 2).

Example H24

An ink was prepared in the same manner as in Example H1, except that the amount of the ultrapure water to be initially charged was changed to 30 g, the amount of guanine was changed to 20 g, and the colorant was changed to 2 g of Nigrosine NB (tradename, manufactured by Sumitomo Chemical Co., Ltd., C.I. Acid Black 2).

Example H25

An ink was prepared in the same manner as in Example H1, except that the amount of the ultrapure water to be initially charged was changed to 30 g, the amount of guanine was changed to 40 g, and the colorant was changed to 5 g of Nigrosine NB (tradename, manufactured by Sumitomo Chemical Co., Ltd., C.I. Acid Black 2).

The inks prepared in Examples H23 to H25 were evaluated for the waterfastness, the storage stability thereof, and the antidrying/anticlogging property. The results were as summarized in the following table. From the results, it is apparent that the amount of the purine derivative added is preferably 1 to 40% by weight based on the ink.

| Ex. | (1) Waterfastness | (2) Storage stability | (3) Clogging |
|-----|---|---|---|
| H23 | A | A | A |
| H24 | A | A | A |
| H25 | B | A | A |

Example H26

An ink was prepared in the same manner as in Example H2, except that the purine derivative was changed to 10 g of theophylline and 10 g of glycerin was added as a humectant.

Example H27

An ink was prepared in the same manner as in Example H2, except that the purine derivative was changed to 10 g of theobromine and 10 g of maltitol was added as a humectant.

Example H28

An ink was prepared in the same manner as in Example H2, except that the purine derivative was changed to 10 g of o-methylguanine and 10 g of thiodiglycol was added as a humectant.

For the inks prepared in Examples H26 to H28, the waterfastness, the storage stability thereof, and the antidrying/anticlogging property were estimated. The results were as summarized in the following table.

| Ex. | (1) Waterfastness | (2) Storage stability | (3) Clogging |
|-----|---|---|---|
| H26 | A | A | A |
| H27 | A | A | A |
| H28 | A | A | A |

Example H29

An ink was prepared in the same manner as in Example H1, except that the amount of Direct Fast Black AB was changed to 4 g, the cationic, water-soluble polymer was changed to 2.5% by weight on a solid basis of a polyallylamine hydrochloride Danfix 723 (tradename, manufactured by Nitto Boseki Co., Ltd.), and, in addition, 5 g of 2-(dimethylamino)ethanol and 10 g of diethylene glycol monobutyl ether as a penetration accelerator were added.

Example H30

An ink was prepared in the same manner as in Example H1, except that the amount of Direct Fast Black AB was changed to 4 g, the cationic, water-soluble polymer was changed to 4% by weight on a solid basis of a copolymer of a diallylamine with sulfur dioxide, PAS-A-1 (tradename, manufactured by Nitto Boseki Co., Ltd.), and, in addition, 4 g of 2-(dimethylamino)ethanol and 0.8 g of a nonionic surfactant Surfynol 465 (tradename, manufactured by Air Products and Chemicals, Inc.) as a penetration accelerator were added.

Example H31

An ink was prepared in the same manner as in Example H1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-M-1 (tradename, manufactured by Nitto Boseki Co., Ltd.), and, in addition, 0.9 g of potassium hydroxide, 10 g of glycerin as a humectant, and 10 g of diethylene glycol monobutyl ether and 0.8 g of a nonionic surfactant Surfynol 465 (tradename, manufactured by Air Products and Chemicals, Inc.) as penetration accelerators were added.

Example H32

An ink was prepared in the same manner as in Example H1, except that the amount of the ultrapure water to be initially charged was changed to 30 g, the amount of Direct Fast Black AB was changed to 6 g, the cationic, water-soluble polymer was changed to 3% by weight on a solid basis of a polydiallylamine PAS-A-5 (tradename, manufactured by Nitto Boseki Co., Ltd.), and, in addition, 0.5 g of potassium hydroxide, 10 g of diethylene glycol as a humectant, and 10 g of triethylene glycol monobutyl ether and 0.8 g of a nonionic surfactant Surfynol 465 (tradename, manufactured by Air Products and Chemicals, Inc.) as penetration accelerators were added.

The inks prepared in Examples H29 to H32 were evaluated for the waterfastness, the storage stability thereof, and the antidrying/anticlogging property. The results were as summarized in the following table. From the results, it is apparent that addition of a penetration accelerator is preferred.

| Ex. | (1) Waterfastness | (2) Storage stability | (3) Clogging |
|-----|---|---|---|
| H29 | A | A | A |
| H30 | A | A | A |
| H31 | A | A | A |
| H32 | A | A | A |

A blotted image was printed, using the inks prepared in Examples H29 to H32 with a penetration accelerator added thereto, on a neutral plain paper Xerox-P (tradename, manufactured by Fuji Xerox Co., Ltd.), an acid plain paper EPP (tradename, manufactured by Seiko Epson Corporation), and a recycled paper Xerox-R (tradename, manufactured by Fuji Xerox Co., Ltd.). As a result, for all the papers, the drying time taken for a gloss of the liquid on the paper to disappear was less than 2 sec. It was confirmed that these inks were fast drying, ultrahigh penetrative inks.

Comparative Example H

Comparative Example H1

An ink was prepared in the same manner as in Example H1, except that the purine derivative was changed from guanine to 15 g of urea and, in addition, 10 g of glycerin was added.

Comparative Example H2

An ink was prepared in the same manner as in Example H1, except that the purine derivative was changed from guanine to 15 g of thiourea and, in addition, 10 g of glycerin was added.

Comparative Example H3

An ink was prepared in the same manner as in Example H1, except that the purine derivative was changed from guanine to 30 g of urea and, in addition, 10 g of glycerin was added.

Comparative Example H4

An ink was prepared in the same manner as in Example H1, except that polyvinyl amine was changed to ultrapure water.

The inks prepared in these comparative examples were evaluated for the waterfastness, the storage stability thereof, and the antidrying/anticlogging property. The results were as summarized in the following table.

| Comp. Ex. | (1) Waterfastness | (2) Storage stability | (3) Clogging |
|---|---|---|---|
| H1 | A | A | D |
| H2 | A | A | D |
| H3 | A | A | C |
| H4 | C | A | A |

What is claimed is:

1. An ink composition comprising water, a colorant, a cationic, water-soluble polymer, and a clogging preventive, wherein the clogging preventive is selected from the group consisting of water-soluble hydroxypyridine derivatives, chain or cyclic amide compounds, imidazole derivatives, hydroxycyclic amine compounds, azole compounds, azine compounds, amidine derivatives, and purine derivatives, wherein the colorant is an organic dye or pigment soluble in an alkali and the colorant is dissolved in the ink composition.

2. The ink composition according to claim 1, wherein the content of the colorant is 0.5 to 20 % by weight.

3. The ink composition according to claim 1, wherein the cationic, water-soluble polymer has in its molecule at least a structure selected from the group consisting of ethyleneimine, vinylamine, allylamine, and diallylamine.

4. The ink composition according to claim 1, which further comprises an acid.

5. The ink composition according to claim 1, wherein the content of the cationic, water-soluble polymer is 0.1 to 20% by weight.

6. The ink composition according to claim 1, wherein the content of the clogging preventive is 1 to 40% by weight.

7. The ink composition according to claim 1, which further comprises a water-soluble organic solvent and/or a saccharide having a lower vapor pressure than pure water.

8. The ink composition according to claim 1, which further comprises a penetration accelerator selected from the group consisting of lower alcohol compounds, cellosolve compounds, carbitol compounds, and nonionic surfactants.

9. A recording method comprising the step of depositing an ink composition onto a recording medium to conduct printing on the recording medium, wherein the ink composition is one according to claim 1.

10. A recorded medium obtained by the method according to claim 9.

11. An ink jet recording method comprising the steps of: ejecting droplets of an ink composition; and depositing the droplets onto a recording medium to conduct printing on the recording medium, wherein the ink composition is one according to claim 1.

* * * * *

UNITED STATES PATENT AND TRADEMARK OFFICE
CERTIFICATE OF CORRECTION

PATENT NO.        : 6,100,315                                              Page 1 of 1
APPLICATION NO. : 09/198817
DATED             : August 8, 2000
INVENTOR(S)       : Kitamura et al.

It is certified that error appears in the above-identified patent and that said Letters Patent is hereby corrected as shown below:

On title page, item 75, "HITOSI" should be -- HITOSHI --

Signed and Sealed this

Seventeenth Day of July, 2007

JON W. DUDAS
*Director of the United States Patent and Trademark Office*